United States Patent
Kinoshita

(10) Patent No.: US 11,220,271 B2
(45) Date of Patent: Jan. 11, 2022

(54) VEHICLE POWER SUPPLY APPARATUS

(71) Applicant: SUBARU CORPORATION, Tokyo (JP)

(72) Inventor: Takahiro Kinoshita, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 368 days.

(21) Appl. No.: 16/402,954

(22) Filed: May 3, 2019

(65) Prior Publication Data

US 2019/0389479 A1 Dec. 26, 2019

(30) Foreign Application Priority Data

Jun. 26, 2018 (JP) .............................. JP2018-120678

(51) Int. Cl.
| | | |
|---|---|---|
| *B60W 50/02* | (2012.01) | |
| *B60R 16/033* | (2006.01) | |
| *B60L 3/00* | (2019.01) | |
| *B60K 6/387* | (2007.10) | |
| *B60K 6/40* | (2007.10) | |
| *B60K 6/26* | (2007.10) | |

(Continued)

(52) U.S. Cl.
CPC ........... *B60W 50/0205* (2013.01); *B60K 6/26* (2013.01); *B60K 6/387* (2013.01); *B60K 6/40* (2013.01);
(Continued)

(58) Field of Classification Search
CPC ............. B60W 50/0205; B60W 20/00; B60W 2710/024; B60W 2710/025; B60W 2520/10; B60W 2710/30; B60W 10/026; B60W 10/06; B60W 10/08; B60W 20/50; B60R 16/033; B60L 3/0023;
(Continued)

(56) References Cited

U.S. PATENT DOCUMENTS 5,024,489 A * 6/1991 Tanaka ...................... B60T 1/10
  303/3
5,887,670 A * 3/1999 Tabata .................. B60W 20/30
  180/65.25

(Continued)

FOREIGN PATENT DOCUMENTS

JP  2013-189944 A   9/2013
JP  2016-193634 A   11/2016
(Continued)

OTHER PUBLICATIONS

Japanese Notice of Reasons for Refusal issued in corresponding Japanese Patent Application No. 2018-120678, dated Mar. 3, 2020, with English translation.

*Primary Examiner* — Richard M Camby
(74) *Attorney, Agent, or Firm* — McDermott Will & Emery LLP

(57) ABSTRACT

A vehicle power supply apparatus includes first and second power supply systems, first and second switches, and a fail-safe controller. The second power supply system includes a generator motor coupled to an engine, and a second electrical energy accumulator able to be coupled to the generator motor. The fail-safe controller inhibits a powering state of the motor generator on the condition that the second switch is in a malfunctioning state in which the second switch is rendered inoperative in a second turn-off state. The second turn-off state includes isolating the generator motor and the second electrical energy accumulator from each other.

18 Claims, 25 Drawing Sheets

(51) Int. Cl.
*B60W 20/00* (2016.01)
*B60K 6/485* (2007.10)

(52) U.S. Cl.
CPC ............ *B60K 6/485* (2013.01); *B60L 3/0023* (2013.01); *B60R 16/033* (2013.01); *B60W 20/00* (2013.01); *B60W 2520/10* (2013.01); *B60W 2710/024* (2013.01); *B60W 2710/025* (2013.01); *B60W 2710/30* (2013.01); *B60Y 2200/92* (2013.01)

(58) Field of Classification Search
CPC ........ B60L 3/0046; B60L 3/04; B60L 3/0092; B60K 6/387; B60K 6/40; B60K 6/26; B60K 6/485; B60K 6/48; B60K 2006/4833; B60K 2006/268; B60Y 2200/92; Y02T 10/62
See application file for complete search history.

(56) References Cited

U.S. PATENT DOCUMENTS

| | | | |
|---|---|---|---|
| 10,800,394 B2 * | 10/2020 | Kinoshita | ............... F02N 11/10 |
| 2006/0116791 A1 * | 6/2006 | Ravula | ................... A01G 25/16 |
| | | | 700/284 |
| 2015/0300308 A1 | 10/2015 | Mori et al. | |
| 2016/0288651 A1 | 10/2016 | Kinoshita | |
| 2017/0259825 A1 | 9/2017 | Okada et al. | |
| 2019/0173412 A1 | 6/2019 | Kawazu | |

FOREIGN PATENT DOCUMENTS

| | | |
|---|---|---|
| JP | 2017-114303 A | 6/2017 |
| JP | 2017-119454 A | 7/2017 |
| JP | 2017-161059 A | 9/2017 |
| JP | 2018-026953 A | 2/2018 |

* cited by examiner

[MALFUNCTIONING DETERMINATION CONTROL, PART 5 AND
 MALFUNCTIONING DETERMINATION CONTROL, PART 6]

[SW1 INSTRUCTION TO TURN ON, SW2: INSTRUCTION TO TURN ON,
 AND ISG: INSTRUCTION TO POWER]
[SW2: NORMAL]

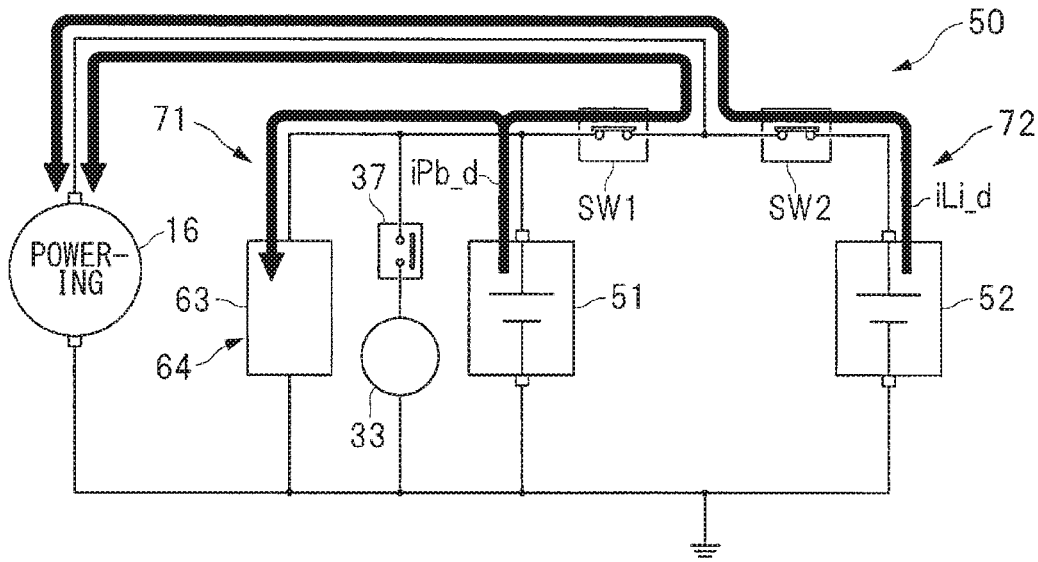

FIG. 19A

[MALFUNCTIONING DETERMINATION CONTROL, PART 5 AND
 MALFUNCTIONING DETERMINATION CONTROL, PART 6]

[SW1 INSTRUCTION TO TURN ON, SW2: INSTRUCTION TO TURN ON,
 AND ISG: INSTRUCTION TO POWER]
[SW2: STUCK OFF]

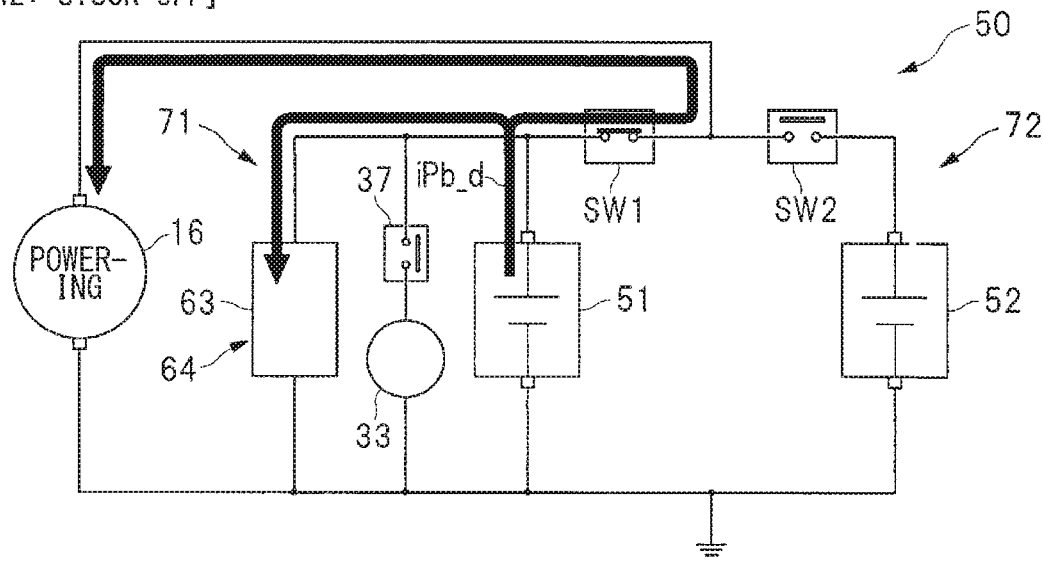

FIG. 19B

VEHICLE POWER SUPPLY APPARATUS

CROSS-REFERENCE TO RELATED APPLICATIONS

This application claims priority from Japanese Patent Application No. 2018-120678 filed on Jun. 26, 2018, the entire contents of which are hereby incorporated by reference.

BACKGROUND

The technology relates to a vehicle power supply apparatus to be mounted on a vehicle.

A vehicle power supply apparatus to be mounted on a vehicle includes not only an accumulator such as a lead battery and a lithium ion battery but also a generator motor such as a motor generator and an integrated starter generator (ISG). For example, reference can be made to Japanese Unexamined Patent Application Publication (JP-A) Nos. 2013-189944, 2016-193634, and 2017-114303. Moreover, such a vehicle power supply apparatus is provided with a switch in order to control a coupling state of the accumulator and the generator motor. The switch includes, for example, semiconductor. The switch of the vehicle power supply apparatus is controlled to an ON state and an OFF state in accordance with an operation state of the generator motor.

SUMMARY

An aspect of the technology provides a vehicle power supply apparatus to be mounted on a vehicle that includes an engine. The vehicle power supply apparatus includes a first power supply system, a second power supply system, a first switch, a second switch, and a fail-safe controller. The first power supply system includes a first electrical energy accumulator and an electric load coupled to the first electrical energy accumulator. The second power supply system includes a generator motor and a second electrical energy accumulator. The generator motor is coupled to the engine and is configured to be controlled to at least a powering state. The second electrical energy accumulator is able to be coupled to the generator motor. The first switch is configured to be controlled to a first turn-on state and a first turn-off state. The first turn-on state includes coupling the first power supply system and the second power supply system to each other, and the first turn-off state includes isolating the first power supply system and the second power supply system from each other. The second switch is configured to be controlled to a second turn-on state and a second turn-off state. The second turn-on state includes coupling the generator motor and the second electrical energy accumulator to each other, and the second turn-off state includes isolating the generator motor and the second electrical energy accumulator from each other. The fail-safe controller is configured to inhibit the powering state of the motor generator on the condition that the second switch is in a malfunctioning state in which the second switch is rendered inoperative in the second turn-off state.

An aspect of the technology provides a vehicle power supply apparatus to be mounted on a vehicle that includes an engine. The vehicle power supply apparatus includes a first power supply system, a second power supply system, a first switch, a second switch, and circuitry. The first power supply system includes a first electrical energy accumulator and an electric load coupled to the first electrical energy accumulator. The second power supply system includes a generator motor and a second electrical energy accumulator. The generator motor is coupled to the engine and is configured to be controlled to at least a powering state. The second electrical energy accumulator is able to be coupled to the generator motor. The first switch is configured to be controlled to a first turn-on state and a first turn-off state. The first turn-on state includes coupling the first power supply system and the second power supply system to each other, and the first turn-off state includes isolating the first power supply system and the second power supply system from each other. The second switch is configured to be controlled to a second turn-on state and a second turn-off state. The second turn-on state includes coupling the generator motor and the second electrical energy accumulator to each other, and the second turn-off state includes isolating the generator motor and the second electrical energy accumulator from each other. The circuitry is configured to inhibit the powering state of the motor generator on the condition that the second switch is in a malfunctioning state in which the second switch is rendered inoperative in the second turn-off state.

BRIEF DESCRIPTION OF THE DRAWINGS

The accompanying drawings are included to provide a further understanding of the technology and are incorporated in and constitute a part of this specification. The drawings illustrate example embodiments and, together with the specification, serve to explain the principles of the technology.

FIGS. 19A and 19B are diagrams of examples of situations as to how currents are supplied, in executing the malfunctioning determination control, part 5 or a malfunctioning determination control, part 6.

DETAILED DESCRIPTION

Figure 1:
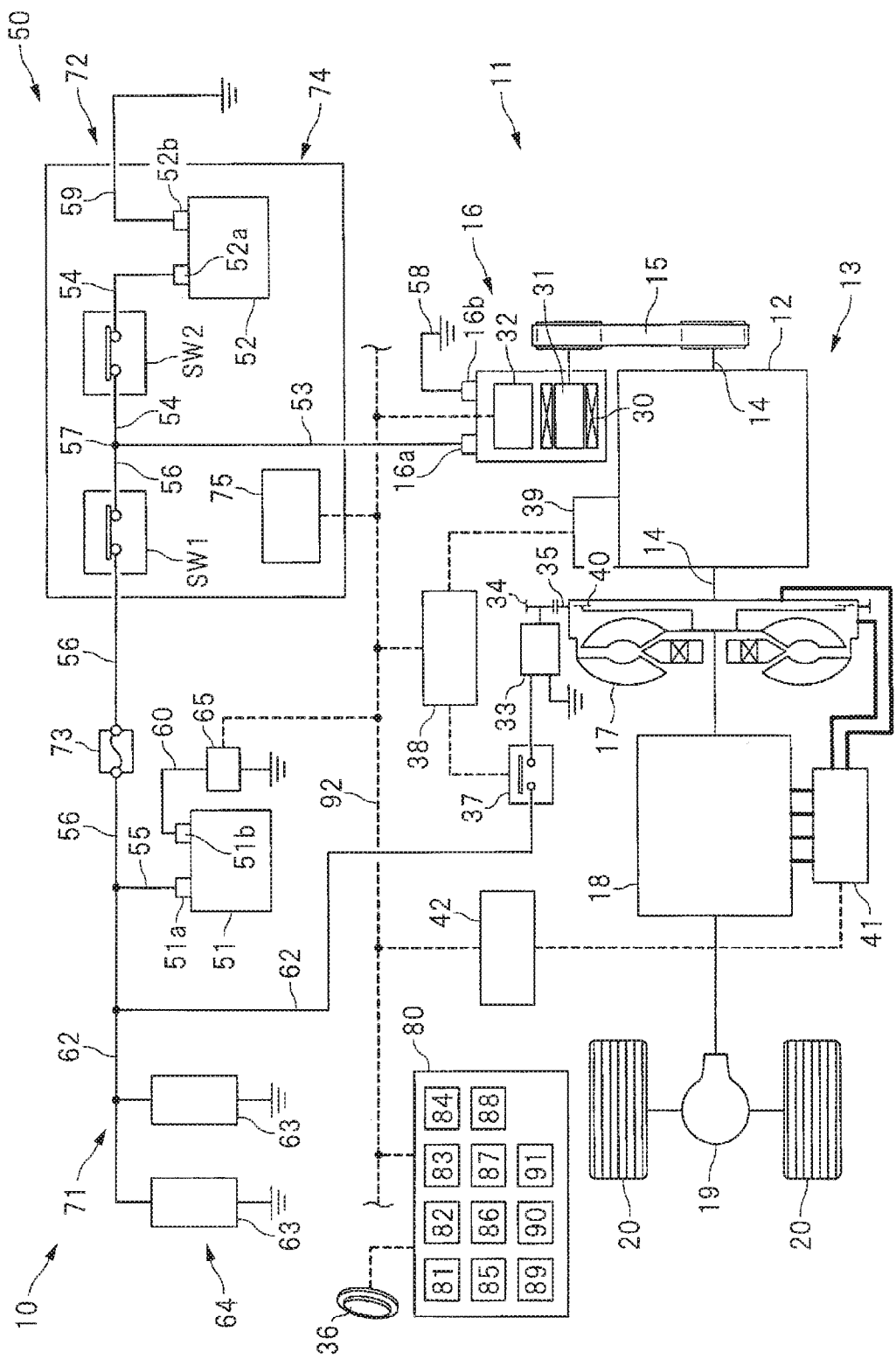
FIG. 1 is a schematic diagram of a configuration example of a vehicle on which a vehicle power supply apparatus according to one embodiment of the technology is mounted.

In the following, some preferred but non-limiting embodiments of the technology are described in detail with reference to the accompanying drawings. Note that sizes, materials, specific values, and any other factors illustrated in respective embodiments are illustrative for easier understanding of the technology, and are not intended to limit the scope of the technology unless otherwise specifically stated. Further, elements in the following example embodiments which are not recited in a most-generic independent claim of the technology are optional and may be provided on an as-needed basis. Throughout the present specification and the drawings, elements having substantially the same function and configuration are denoted with the same reference numerals to avoid any redundant description. Further, elements that are not directly related to the technology are unillustrated in the drawings. The drawings are schematic and are not intended to be drawn to scale.

In a case where a switch in a vehicle power supply apparatus has a malfunction, it is difficult to control a coupling state of an accumulator and a generator motor, resulting in difficulties in allowing the vehicle power supply apparatus to function appropriately. Examples of the malfunction may include that the switch is rendered inoperative in an OFF state, i.e., that the switch is stuck OFF. What is desired is, therefore, to control the generator motor appropriately in the case where the switch is stuck OFF.

It is desirable to provide a vehicle power supply apparatus that makes it possible to control a generator motor appropriately in a case where a switch is rendered inoperative in an OFF state.

[Vehicle Configuration]

FIG. 1 schematically illustrates a configuration example of a vehicle 11 on which a vehicle power supply apparatus 10 according to one embodiment of the technology is mounted. Referring to FIG. 1, on the vehicle 11, a power unit 13 may be mounted. The power unit 13 may include an engine 12 that serves as a power source. The engine 12 may include a crank shaft 14 to which a starter generator 16 is coupled through a belt mechanism 15. A transmission mechanism 18 may be also coupled to the engine 12 through a torque converter 17. One or more wheels 20 may be coupled to the transmission mechanism 18 through, for example but not limited to, a differential mechanism 19.

In one embodiment of the technology, the starter generator 16 may serve as a "generator motor".

The starter generator 16 coupled to the engine 12 may be a so-called integrated starter generator (ISG) that serves as a generator and an electric motor. Not only may the starter generator 16 serve as the generator driven by the crank shaft 14, the starter generator 16 may also serve as the electric motor that drives the crank shaft 14. For example, the starter generator 16 may be controlled to a powering state, in a case of a restart of the engine 12 in an idling stop control, or in a case of assistance with the engine 12 at the time of, for example, a start and acceleration. Thus, the starter generator 16 may serve as the electric motor.

The starter generator 16 may include a stator 30 and a rotor 31. The stator 30 may include a stator coil. The rotor 31 may include a field coil. The starter generator 16 may further include an ISG controller 32, in order to control energized states of the stator coil and the field coil. The ISG controller 32 may include an inverter, a regulator, a microcomputer, various sensors, and other parts. Allowing the ISG controller 32 to control the energized states of the field coil and the stator coil causes a control of, for example but not limited to, a power generation voltage, power generation torque, and powering torque of the starter generator 16. It is to be noted that the ISG controller 32 may have a function of detecting a terminal voltage of the starter generator 16. In the following, the terminal voltage of the starter generator 16 is also referred to the power generation voltage of the starter generator 16, or an applied voltage to the starter generator 16.

In one embodiment of the technology, the terminal voltage of the starter generator 16 may serve as a "power generation voltage of a generator motor" and a "voltage of the generator motor".

The power unit 13 may include a starter motor 33 that brings the engine 12 to starting rotation. The starter motor 33 may include a pinion 34. The pinion 34 is able to move between a protruding position and a retreating position. At the protruding position, the pinion 34 is engaged with a ring gear 35 of the torque converter 17. At the retreating position, the engagement of the pinion 34 with the ring gear 35 is released. As described later, an occupant operates, e.g., presses down, a starter button 36, and thereupon, a starter relay 37 is switched to an ON state. The starter relay 37 may control energization of the starter motor 33. Thus, the starter motor 33 is energized through the starter relay 37, causing the pinion 34 of the starter motor 33 to move to the protruding position and to rotate. Moreover, the vehicle 11 may include an engine controller 38 in order to control the starter motor 33 through the starter relay 37. The engine controller 38 may include, for example but not limited to, a microcomputer. The engine controller 38 may control not only the starter relay 37 but also engine auxiliaries 39 such as a throttle valve, an injector, and an ignition device.

As described, the vehicle 11 in the figures may include, as the electric motor that brings the engine 12 to the starting rotation, the starter generator 16 and the starter motor 33.

The starting rotation of the engine 12 is performed with the use of the starter generator 16, in a case of the restart of the engine 12 by the idling stop control, i.e., in a case where the engine 12 is stopped because a stop condition is satisfied while the engine 12 is in operation, and the engine 12 is restarted because a start condition is satisfied while the engine 12 is stopped. Meanwhile, the starting rotation of the engine 12 is performed with the use of the starter motor 33, in a case where a control system of the vehicle 11 is started up to cause an initial start of the engine 12, i.e., in a case where the occupant operates the starter button 36 to start the engine 12.

The torque converter 17 may further include a lock up clutch 40. Controlling the lock up clutch 40 to an engaged state causes the engine 12 and the transmission mechanism 18 to be coupled through the lock up clutch 40. Meanwhile, controlling the lock up clutch 40 to a disengaged state causes the engine 12 and the transmission mechanism 18 to be coupled through the torque converter 17. Moreover, the lock up clutch 40 may be able to be controlled not only to the engaged state and the disengaged state, but also to a slip state. In order to switch an operation state of the lock up clutch 40, a valve unit 41 may be coupled to the torque converter 17, and a transmission controller 42 may be coupled to the valve unit 41. The valve unit 41 may include, for example but not limited to, a solenoid valve and an oil path. The transmission controller 42 may include, for example but not limited to, a microcomputer.

[Power Circuit]

Figure 2:
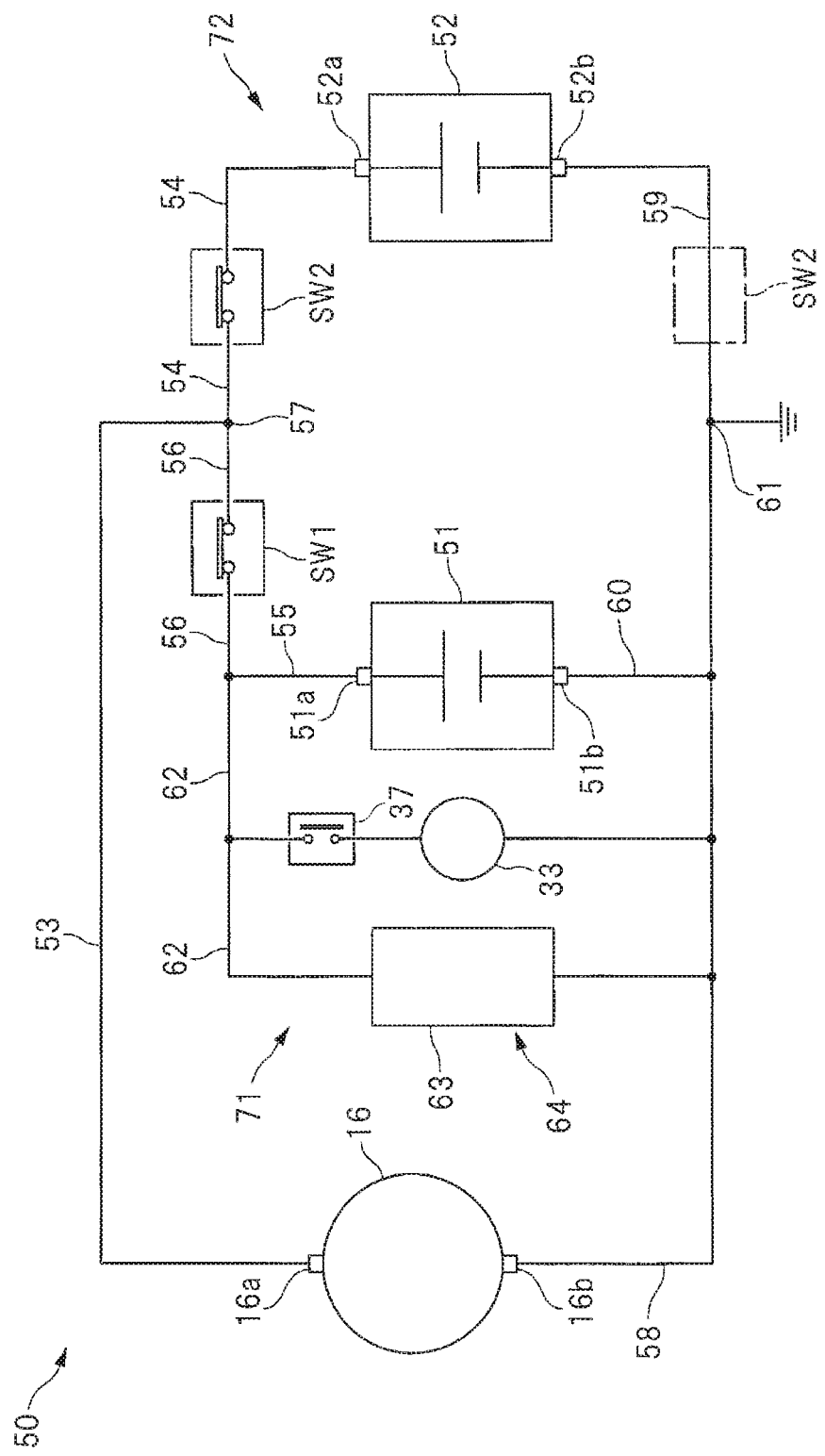
FIG. 2 is a circuit diagram of a simplified example of a power circuit.

The vehicle power supply apparatus 10 may include a power circuit 50, description of which is given below. FIG. 2 is a circuit diagram of a simplified example of the power circuit 50. Referring to FIG. 2, the power circuit 50 may include a lead battery 51 and a lithium ion battery 52. The lead battery 51 may be electrically coupled to the starter generator 16. The lithium ion battery 52 may be electrically coupled, in parallel with the lead battery 51, to the starter generator 16. It is to be noted that a terminal voltage of the lithium ion battery 52 may be higher in design than a terminal voltage of the lead battery 51, in order to positively cause discharge of the lithium ion battery 52. Moreover, internal resistance of the lithium ion battery 52 may be lower in design than internal resistance of the lead battery 51, in order to positively cause charge and the discharge of the lithium ion battery 52.

In one embodiment of the technology, the lead battery 51 may serve as a "first electrical energy accumulator". In one embodiment of the technology, the lithium ion battery 52 may serve as a "second electrical energy accumulator".

A positive electrode line 53 may be coupled to a positive electrode terminal 16a of the starter generator 16. A positive electrode line 54 may be coupled to a positive electrode terminal 52a of the lithium ion battery 52. A positive electrode line 56 may be coupled to a positive electrode terminal 51a of the lead battery 51 through a positive electrode line 55. The positive electrode lines 53, 54, and 56 may be coupled to one another through a connection point 57. Moreover, a negative electrode line 58 may be coupled to a negative electrode terminal 16b of the starter generator 16. A negative electrode line 59 may be coupled to a negative electrode terminal 52b of the lithium ion battery 52. A negative electrode line 60 may be coupled to a negative electrode terminal 51b of the lead battery 51. The negative electrode lines 58, 59, and 60 may be coupled to one another through a reference potential point 61.

As illustrated in FIG. 1, to the positive electrode line 55 of the lead battery 51, coupled may be a positive electrode line 62. To the positive electrode line 62, coupled may be a group of electric devices 64 including electric devices 63 such as various actuators and various controllers. Moreover, to the negative electrode line 60 of the lead battery 51, coupled may be a battery sensor 65. The battery sensor 65 may have a function of detecting a charge state and a discharge state of the lead battery 51. Non-limiting examples of the charge state and the discharge state of the lead battery 51 may include a charge current, a discharge current, the terminal voltage, a state of charge SOC of the lead battery 51. It is to be noted that the state of charge SOC refers to a ratio of an amount of charged power to a designed capacity of a battery.

In one embodiment of the technology, the electric devices 63 may each serve as an "electric load".

The power circuit 50 may include a first power supply system 71 and a second power supply system 72. The first power supply system 71 includes the lead battery 51 and the electric devices 63. The second power supply system 72 includes the lithium ion battery 52 and the starter generator 16. The first power supply system 71 and the second power supply system 72 may be coupled to each other through the positive electrode line 56. On the positive electrode line 56, provided may be an electric power fuse 73 and a switch SW1. The electric power fuse 73 is configured to be melted down by an excessive current. The switch SW1 is configured to be controlled to an ON state and an OFF state. Moreover, on the positive electrode line 54 of the lithium ion battery 52, provided may be a switch SW2. The switch SW2 is configured to be controlled to an ON state and an OFF state.

In one embodiment of the technology, the switch SW1 may serve as a "first switch", and the switch SW2 may serve as a "second switch". In one embodiment of the technology, the ON state of the switch SW1 may serve as a "first turn-on state", and the OFF state of the switch SW1 may serve as a "first turn-off state". In one embodiment of the technology, the ON state of the switch SW2 may serve as a "second turn-on state", and the OFF state of the switch SW2 may serve as a "second turn-off state".

Controlling the switch SW1 to the ON state makes it possible to couple the first power supply system 71 and the second power supply system 72 to each other. Controlling the switch SW1 to the OFF state makes it possible to isolate the first power supply system 71 and the second power supply system 72 from each other. Moreover, controlling the switch SW2 to the ON state makes it possible to couple the starter generator 16 and the lithium ion battery 52 to each other. Controlling the switch SW2 to the OFF state makes it possible to isolate the starter generator 16 and the lithium ion battery 52 from each other.

The switches SW1 and SW2 may each be a switch including a semiconductor element such as a metal oxide semiconductor field effect transistor (MOSFET), or alternatively the switches SW1 and SW2 may each be a switch that causes a contact to mechanically open or close with the use of, for example but not limited to, electromagnetic force. The ON state of the switches SW1 and SW2 refers to an energized state that forms electrical coupling, or a conductive state. The OFF state of the switches SW1 and SW2 refers to a non-energized state that forms electrical isolation, or a cutoff state. It is to be noted that the switches SW1 and SW2 may be also referred to as, for example, a relay or a contactor.

As illustrated in FIG. 1, the power circuit 50 may include a battery module 74. The battery module 74 may include not only the lithium ion battery 52 but also the switches SW1 and SW2. The battery module 74 may further include a battery controller 75. The battery controller 75 may include, for example but not limited to, a microcomputer and various sensors. The battery controller 75 may have a function of monitoring, for example but not limited to, a state of charge SOC, a charge current, a discharge current, the terminal voltage, a cell temperature, and the internal resistance of the lithium ion battery 52. The battery controller 75 may also have a function of controlling the switches SW1 and SW2.

[Control System]

As illustrated in FIG. 1, the vehicle power supply apparatus 10 may include a main controller 80. The main controller 80 is provided for a cooperative control of, for example but not limited to, the power unit 13 and the power circuit 50. The main controller 80 may include, for example but not limited to, a microcomputer. The main controller 80 may include an engine control unit 81, an ISG control unit 82, a first switch control unit 83, a second switch control unit 84, and a malfunctioning determination unit 85. The engine control unit 81 may control the engine 12. The ISG control unit 82 may control the starter generator 16. The first switch control unit 83 may control the switch SW1. The second switch control unit 84 may control the switch SW2. The malfunctioning determination unit 85 may determine whether or not the switch SW2 is in a malfunctioning state. The main controller 80 may further include a starter control unit 86 and a clutch control unit 87. The starter control unit 86 may control the starter motor 33. The clutch control unit 87 may control the lock up clutch 40. The main controller 80 may further include an idling control unit 88, an assistance control unit 89, and a slip control unit 90. The idling control unit 88 may execute the idling stop control described later. The assistance control unit 89 may execute a motor assistance control described later. The slip control unit 90 may execute a slip control of the lock up clutch on coasting described later. The main controller 80 may further include, for example but not limited to, a fail-safe control unit 91. The fail-safe control unit 91 may execute a fail-safe control described later.

In one embodiment of the technology, the ISG control unit 82 may serve as a "generator motor controller". In one embodiment of the technology, the slip control of the lock up clutch on the coasting may serve as a "slip control of the lock up clutch".

The main controller 80, the ISG controller 32, the engine controller 38, the transmission controller 42, and the battery controller 75 may be communicatively coupled to one another through an on-vehicle network 92 such as a controller area network (CAN) and a local interconnect network (LIN). The main controller 80 may control the power unit 13, the power circuit 50, and other parts on the basis of information from the controllers and the sensors. It is to be noted that the main controller 80 may control the starter generator 16 through the ISG controller 32, and control the switches SW1 and SW2 through the battery controller 75. Moreover, the main controller 80 may control the engine 12 and the starter motor 33 through the engine controller 38, and control the lock up clutch 40 through the transmission controller 42.

[Power Generation Control of Starter Generator]

Description is given next of a power generation control of the starter generator 16. The power generation control may be made by the main controller 80. The ISG control unit 82 of the main controller 80 may supply a control signal to the ISG controller 32, to control the starter generator 16 to a power generation state or the powering state. The power generation state of the starter generator 16 may include a combustion power generation state and a regenerative power generation state described later. For example, in a case where the state of charge SOC of the lithium ion battery 52 lowers, the ISG control unit 82 may raise the power generation voltage of the starter generator 16, to control the starter generator 16 to the combustion power generation state. In a case where the state of charge SOC of the lithium ion battery 52 increases, the ISG control unit 82 may lower the power generation voltage of the starter generator 16, to control the starter generator 16 to a power generation suspended state. It is to be noted that in FIG. 3 and subsequent figures which are described below, the starter generator 16 is abbreviated to "ISG".

Figure 3:
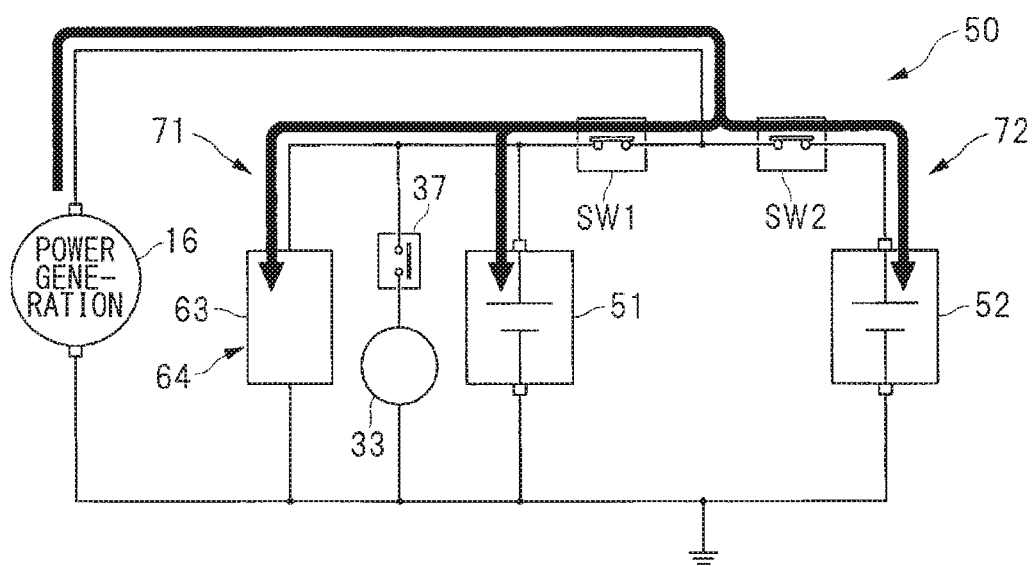
FIG. 3 is a diagram of an example of a situation as to how currents are supplied, with a starter generator controlled to a combustion power generation state.

FIG. 3 illustrates an example of a situation as to how currents are supplied, with the starter generator 16 controlled to the combustion power generation state. In one specific but non-limiting example, in a case where the state of charge SOC of the lithium ion battery 52 is lower than a predetermined lower limit, the starter generator 16 may be driven, by engine power, for power generation, in order to charge the lithium ion battery 52 and to increase the state of charge SOC. Thus, in controlling the starter generator 16 to the combustion power generation state, the power generation voltage of the starter generator 16 may be raised to a greater value than the terminal voltages of the lead battery 51 and the lithium ion battery 52. In this way, as denoted by black arrows in FIG. 3, currents may be supplied from the starter generator 16 to, for example, the lithium ion battery 52, the group of the electric devices 64, and the lead battery 51, causing the lithium ion battery 52 and the lead battery 51 to be charged slowly. It is to be noted that the combustion power generation state of the starter generator 16 means allowing, by the engine power, the starter generator 16 to generate power, i.e., causing fuel combustion inside the engine 12 to allow the starter generator 16 to generate power.

In one embodiment of the technology, the combustion power generation state may serve as a "normal power generation state".

Figure 4:
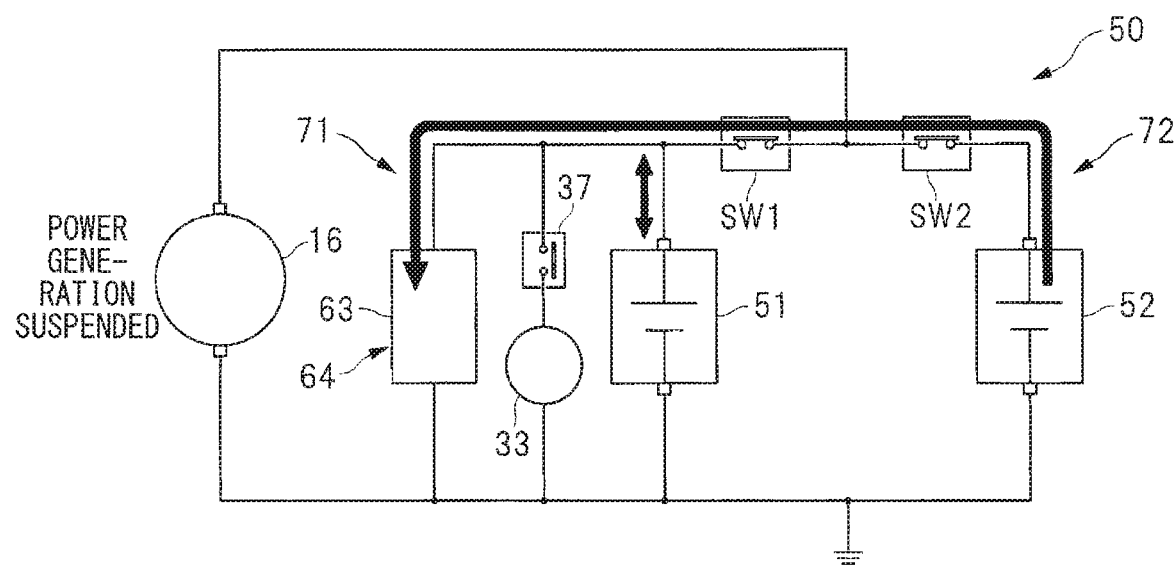
FIG. 4 is a diagram of an example of a situation as to how currents are supplied, with the starter generator controlled to a power generation suspended state.

FIG. 4 illustrates an example of a situation as to how currents are supplied, with the starter generator 16 controlled to the power generation suspended state. In one specific but non-limiting example, in a case where the state of charge SOC of the lithium ion battery 52 is higher than a predetermined upper limit, driving the starter generator 16, by the engine power, for the power generation may be stopped, in order to positively cause the discharge of the lithium ion battery 52. Thus, in controlling the starter generator 16 to the power generation suspended state, the power generation voltage of the starter generator 16 may be lowered to a smaller value than the terminal voltages of the lead battery 51 and the lithium ion battery 52. In this way, as denoted by black arrows in FIG. 4, a current may be supplied from the lithium ion battery 52 to the group of the electric devices 64. This makes it possible to stop the power generation of the starter generator 16, leading to reduction in an engine load. It is to be noted that it suffices for the power generation voltage of the starter generator 16 in the power generation suspended state to be a power generation voltage that allows the lithium ion battery 52 to discharge. For example, the power generation voltage of the starter generator 16 may be controlled to 0 (zero) V, or alternatively, the power generation voltage of the starter generator 16 may be controlled to a greater value than 0 (zero) V.

As mentioned above, the ISG control unit 82 of the main controller 80 may control the starter generator 16 to the combustion power generation state or the power generation suspended state on the basis of the state of charge SOC.

Meanwhile, at the time of vehicle deceleration, it is desirable to recover much kinetic energy to enhance fuel consumption performance. Therefore, at the time of the vehicle deceleration, the power generation voltage of the starter generator 16 may be raised, to control the starter generator 16 to the regenerative power generation state. This makes it possible to increase power-generated electric power of the starter generator 16. It is therefore possible to positively convert the kinetic energy to electric energy and to recover the electric energy, leading to higher energy efficiency of the vehicle 11 and enhancement in the fuel consumption performance. A determination as to whether or not to execute regenerative power generation as described above may be made on the basis of, for example but not limited to, operation states of an accelerator pedal and a brake pedal. For example, on decelerated travel with a release of stepping down of the accelerator pedal, or on decelerated travel with stepping down of the brake pedal, the starter generator 16 may be controlled to the regenerative power generation state.

Figure 5:
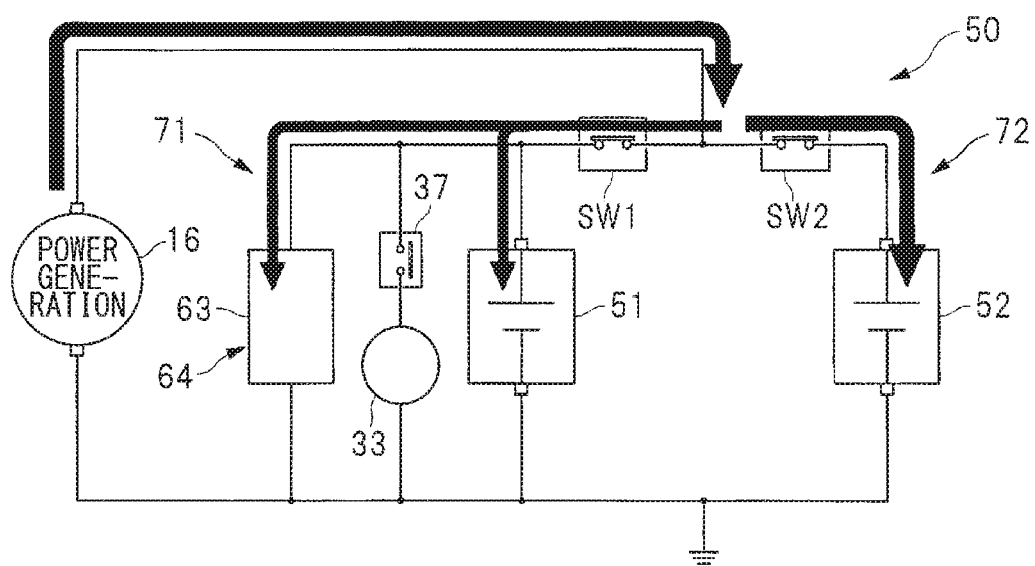
FIG. 5 is a diagram of an example of a situation as to how currents are supplied, with the starter generator controlled to a regenerative power generation state.

FIG. 5 illustrates an example of a situation as to how currents are supplied, with the starter generator 16 controlled to the regenerative power generation state. In controlling the starter generator 16 to the regenerative power generation state, the power generation voltage of the starter generator 16 may be raised to a higher value than in the combustion power generation state as mentioned above. This causes large current supply from the starter generator 16 to the lithium ion battery 52 and the lead battery 51, as denoted by black arrows in FIG. 5, resulting in rapid charge of the lithium ion battery 52 and the lead battery 51. Moreover, because the internal resistance of the lithium ion battery 52 is smaller than the internal resistance of the lead battery 51, most of the power-generated current is supplied to the lithium ion battery 52.

It is to be noted that as illustrated in FIGS. 3 to 5, in controlling the starter generator 16 to the combustion power generation state, the regenerative power generation state, and the power generation suspended state, the switches SW1 and SW2 may be kept in the ON state. In other words, in the vehicle power supply apparatus 10, it is possible to control the charge and the discharge of the lithium ion battery 52 solely by controlling the power generation voltage of the starter generator 16 without making a switching control of the switches SW1 and SW2. Hence, it is possible to easily control the charge and the discharge of the lithium ion battery 52, and to enhance durability of the switches SW1 and SW2.

[Engine Restart in Idling Stop Control]

The idling control unit 88 of the main controller 80 may execute the idling stop control. The idling stop control includes automatically stopping and restarting the engine 12. The idling control unit 88 may execute, for example but not limited to, a fuel cut to stop the engine 12, in the case where the predetermined stop condition is satisfied while the engine 12 is in operation. The idling control unit 88 may bring the starter generator 16 to rotation to restart the engine 12, in the case where the predetermined start condition is satisfied while the engine 12 is stopped. Non-limiting examples of the stop condition of the engine 12 may include that a vehicle speed is lower than a predetermined value, with the brake pedal being stepped down. Non-limiting examples of the start condition of the engine 12 may include that stepping down of the brake pedal is released, and that stepping down of the accelerator pedal is started. It is to be noted that in executing the idling stop control, the idling control unit 88 may supply a control signal to the engine control unit 81 and the ISG control unit 82, to control the engine 12 and the starter generator 16.

Figure 6:
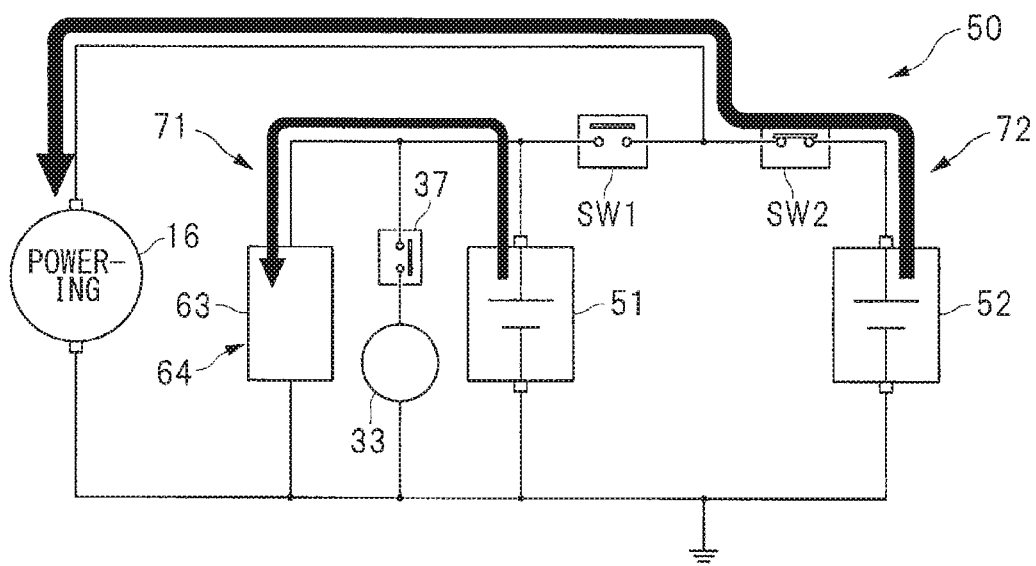
FIG. 6 is a diagram of an example of a situation as to how currents are supplied, with the starter generator controlled to a powering state.

The idling control unit 88 may control the starter generator 16 to the powering state, to bring the engine 12 to the starting rotation, in a case where the start condition is satisfied while the engine 12 is stopped in the idling stop control. FIG. 6 illustrates an example of a situation as to how currents are supplied, with the starter generator 16 controlled to the powering state. As illustrated in FIG. 6, in controlling the starter generator 16 to the powering state at the restart of the engine 12 in the idling stop control, the switch SW1 may be switched from the ON state to the OFF state. In other words, in allowing the starter generator 16 to bring the engine 12 to the starting rotation, the switch SW1 may be switched to the OFF state, causing the isolation of the first power supply system 71 and the second power supply system 72 from each other. This makes it possible to prevent an instantaneous voltage drop with respect to the group of the electric devices 64 of the first power supply system 71 even in a case with large current supply from the lithium ion battery 52 to the starter generator 16. It is therefore possible to allow the group of the electric devices 64, without limitation, to function normally.

[Motor Assistance Control]

The assistance control unit 89 of the main controller 80 may control the starter generator 16 to the powering state at the time of, for example, the start and the acceleration, to execute the motor assistance control. The motor assistance control includes allowing the starter generator 16 to provide assistance with the engine 12. It is to be noted that in executing the motor assistance control, the assistance control unit 89 may supply a control signal to the ISG control unit 82, to control the starter generator 16.

Figure 7:
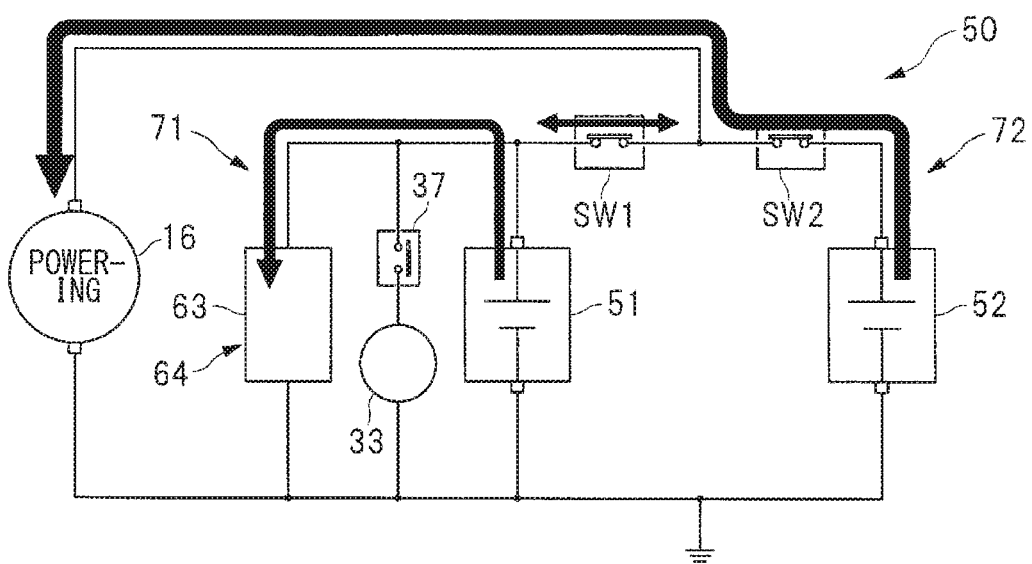
FIG. 7 is a diagram of an example of a situation as to how currents are supplied, with the starter generator controlled to the powering state.

FIG. 7 illustrates an example of a situation as to how currents are supplied, with the starter generator 16 controlled to the powering state. As illustrated in FIG. 7, in controlling the starter generator 16 to the powering state in accompaniment with the motor assistance control, the switches SW1 and SW2 may both be kept at the ON state. Thus, in the case where the starter generator 16 is allowed to provide assistance with the engine 12, controlling the switches SW1 and SW2 to the ON state causes both the lead battery 51 and the lithium ion battery 52 to be coupled to the group of the electric devices 64. This makes it possible to stabilize a power supply voltage of the group of the electric devices 64, leading to enhancement in reliability of the vehicle power supply apparatus 10.

As mentioned above, the switch SW1 may be switched to the OFF state at the restart of the engine 12 by the starter generator 16. Meanwhile, the switch SW1 may be kept at the ON state while the starter generator 16 provides motor assistance. In other words, the restart of the engine 12 means a situation that the starter generator 16 causes the engine 12 that is stopped to start rotation. Such a situation may easily involve an increase in power consumption of the starter generator 16. In contrast, the motor assistance means a situation that the starter generator 16 may supplementarily drive the engine 12 that is rotating. Such a situation may involve reduction in the power consumption of the starter generator 16. Because the power consumption of the starter generator 16 is reduced as mentioned above in the motor assistance control, keeping the switch SW1 at the ON state causes no large current supply from the lead battery 51 to the starter generator 16. It is therefore possible to stabilize the power supply voltage of the group of the electric devices 64.

[Engine Initial Start Control and Lead Battery Supplementary Charge Control]

Figure 8:
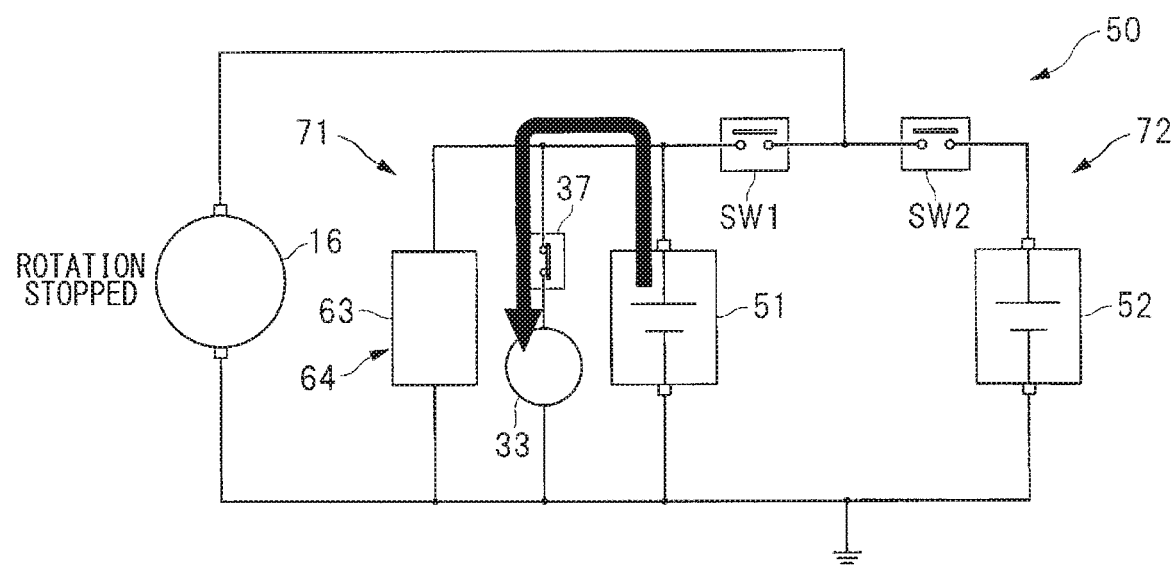
FIG. 8 is a diagram of an example of a situation as to how currents are supplied, in an engine initial start control.
Figure 9:
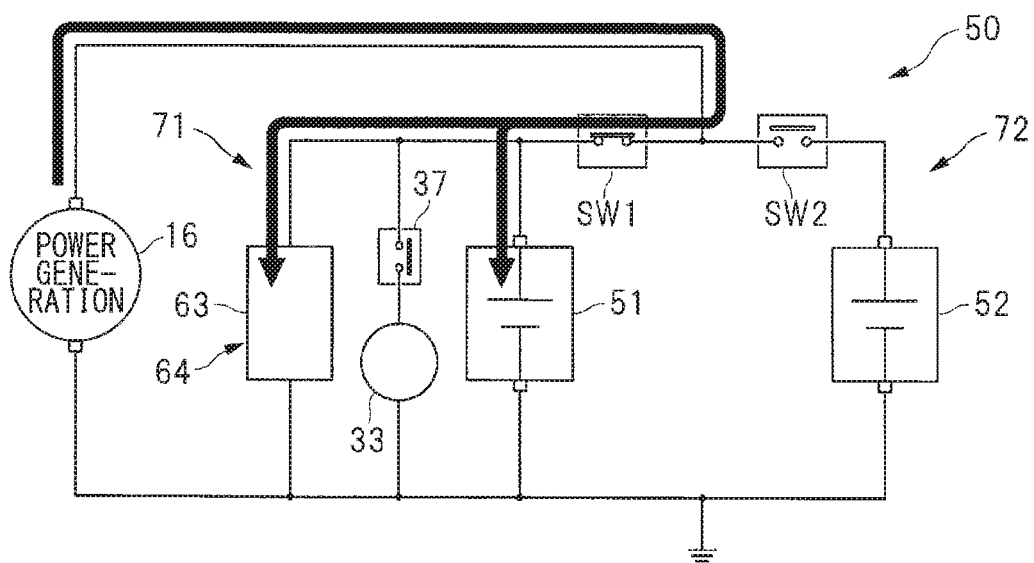
FIG. 9 is a diagram of an example of a situation as to how currents are supplied, in a lead battery supplementary charge control.

Described next is an engine initial start control that includes starting the engine 12 with the use of the starter motor 33, following which described is a lead battery supplementary charge control to be executed by the starter generator 16 after an initial start of the engine 12. FIG. 8 illustrates an example of a situation as to how currents are supplied, in the engine initial start control. FIG. 9 illustrates an example of a situation as to how currents are supplied, in the lead battery supplementary charge control.

In a case where the control system of the vehicle 11 is started up, to cause the initial start of the engine 12, i.e., in a case where the operation of the starter button 36 starts the engine 12, the starter motor 33 may bring the engine 12 to the starting rotation. In the engine initial start control, as illustrated in FIG. 8, the switch SW1 may be controlled to the OFF state. The switch SW2 may be controlled to the OFF state. The starter relay 37 may be controlled to an ON state. Thus, currents are supplied from the lead battery 51 to the starter motor 33, bringing the starter motor 33 to rotation, to start the engine 12.

Thus, the engine 12 is started by the starter motor 33, and thereupon, as illustrated in FIG. 9, the starter relay 37 may be switched to an OFF state. The switch SW1 may be switched to the ON state. The starter generator 16 may be controlled to the combustion power generation state. In other words, at the start of the engine 12, while the switch SW2 is kept at the OFF state, the switch SW1 may be switched to the ON state, and the starter generator 16 may be controlled to the combustion power generation state. This makes it possible to allow the starter generator 16 to positively charge the lead battery 51, leading to restoration of the state of charge SOC of the lead battery 51 that tends to lower during a stop of the vehicle 11 or at the initial start of the engine 12.

Specifically, during the stop of the vehicle 11, a dark current flows from the lead battery 51 to the group of the electric devices 64. At the initial start of the engine 12, a large current flows from the lead battery 51 to the starter motor 33. Accordingly, the state of charge SOC of the lead battery 51 decreases gradually during the stop of the vehicle 11 and at the initial start of the engine 12. Executing the lead battery supplementary charge control after the initial start of the engine 12 causes the restoration of the lowered state of charge SOC of the lead battery 51. It is to be noted that the lead battery supplementary charge control may be continued for predetermined time, or alternatively, the lead battery supplementary charge control may be continued until the state of charge SOC of the lead battery 51 is restored to a predetermined value.

[Switch SW2 Malfunctioning Determination Control]

In the following, described is a malfunctioning determination control of the switch SW2 to be executed by the vehicle power supply apparatus 10. As mentioned above, the switch SW2 may be controlled to the ON state and the OFF state in accordance with the operation state of the vehicle power supply apparatus 10. However, in a case of a malfunctioning state in which the switch SW2 is rendered inoperative in the OFF state, i.e., the switch SW1 is stuck OFF, it is difficult to allow the vehicle power supply apparatus 10 to operate appropriately. Thus, the vehicle power supply apparatus 10 according to this embodiment of the technology may execute one or more of parts 1 to 8 of the malfunctioning determination control as follows, to determine whether or not the switch SW2 is stuck OFF.

As described later, in the malfunctioning determination control, parts 1 to 8, the malfunctioning determination unit 85 of the main controller 80 may determine whether or not the switch SW2 is stuck OFF on the basis of a current of the lead battery 51, a current of the lithium ion battery 52, or a voltage of the starter generator 16, or any combination thereof, while recognizing a control signal to be transmitted to the starter generator 16, a control signal to be transmitted to the switch SW1, and a control signal to be transmitted to the switch SW2.

In one embodiment of the technology, the control signal to be transmitted to the starter generator 16 may serve as a "first control signal". In one embodiment of the technology, the control signal to be transmitted to the switch SW1 may serve as a "second control signal". In one embodiment of the technology, the control signal to be transmitted to the switch SW2 may serve as a "third control signal".

It is to be noted that the ISG control unit 82 of the main controller 80 may transmit the control signal to the starter generator 16 through the ISG controller 32. Specific but non-limiting examples of the control signal to be transmitted to the starter generator 16 may include a power generation signal, a power generation suspension signal, and a powering signal. The power generation signal may control the starter generator 16 to the combustion power generation state or the regenerative power generation state. The power generation suspension signal may control the starter generator 16 to the power generation suspended state. The powering signal may control the starter generator 16 to the powering state.

The first switch control unit 83 of the main controller 80 may transmit the control signal to the switch SW1 through the battery controller 75. Specific but non-limiting examples of the control signal to be transmitted to the switch SW1 may include an ON signal that controls the switch SW1 to the ON state, and an OFF signal that controls the switch SW1 to the OFF state. The second switch control unit 84 of the main controller 80 may transmit the control signal to the switch SW2 through the battery controller 75. Specific but non-limiting examples of the control signal to be transmitted to the switch SW2 may include an ON signal that controls the switch SW2 to the ON state, and an OFF signal that controls the switch SW2 to the OFF state.

(Malfunctioning Determination Control, Part 1)

Figure 10:
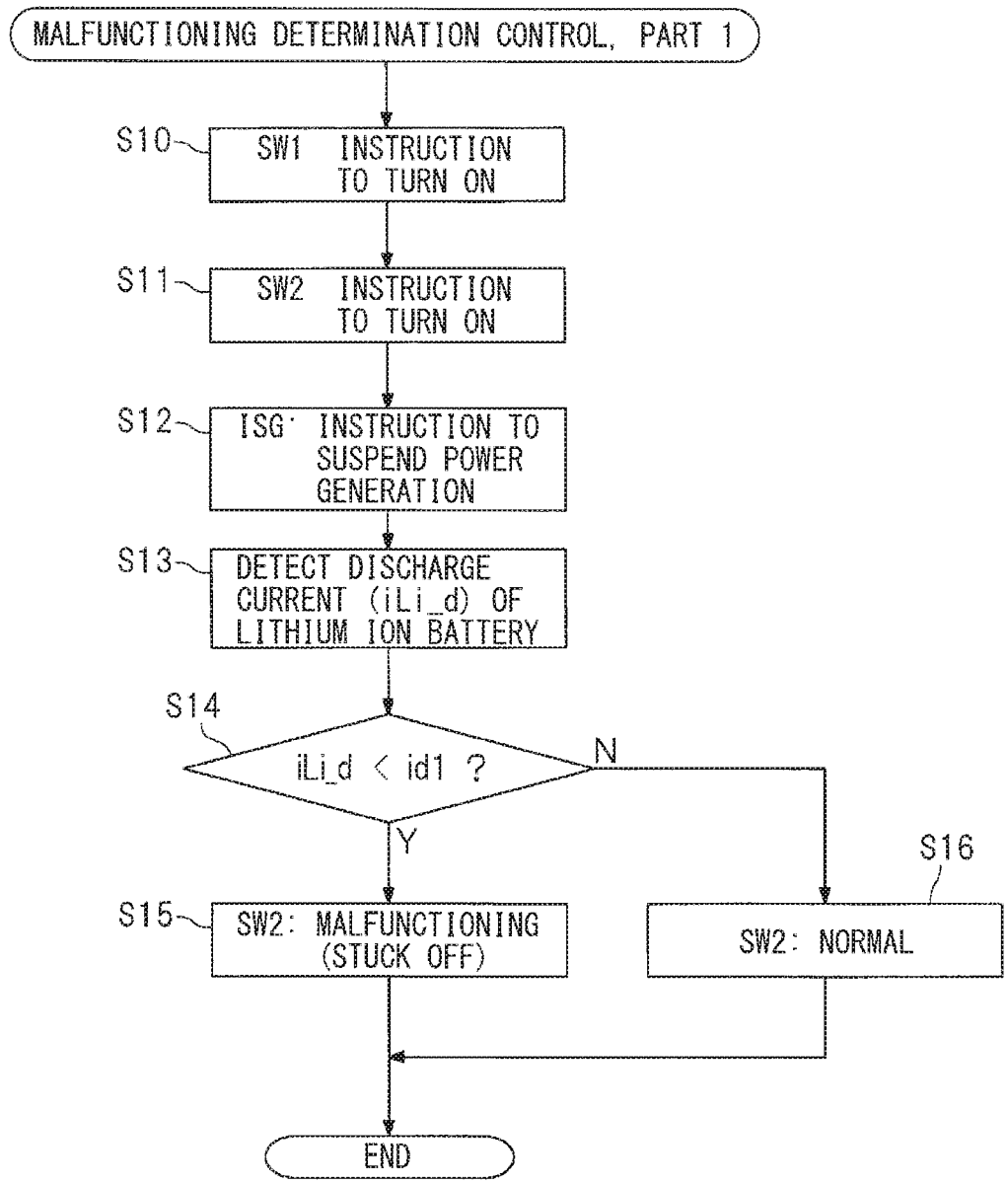
FIG. 10 is a flowchart of an example of an execution procedure in a malfunctioning determination control, part 1.
Figure 11A:
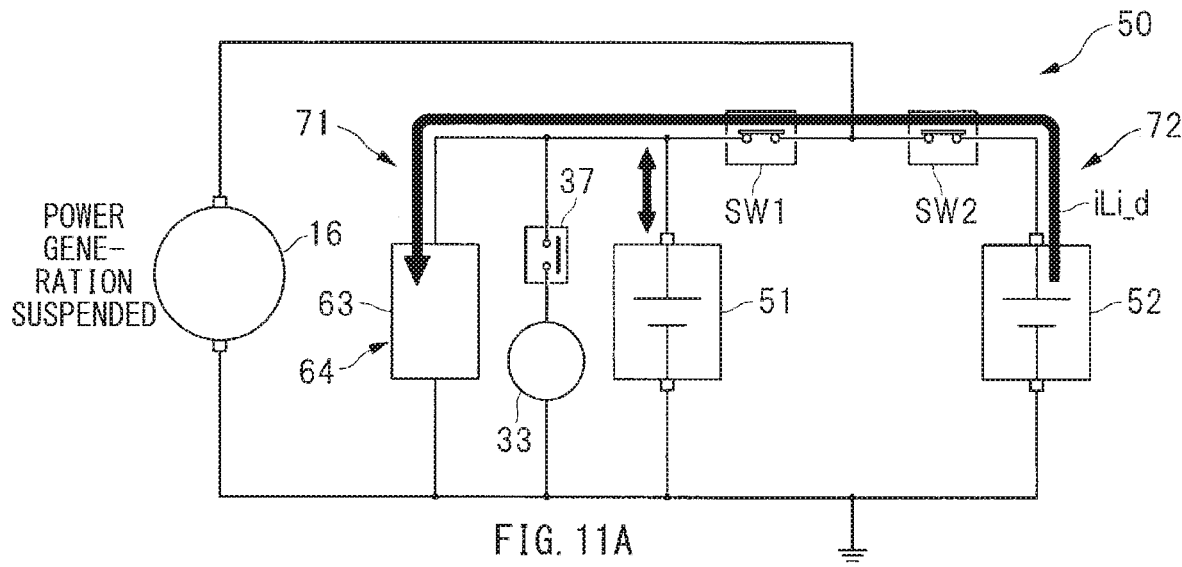
FIGS. 11A and 11B are diagrams of examples of situations as to how currents are supplied, in executing the malfunctioning determination control, part 1.
Figure 11B:
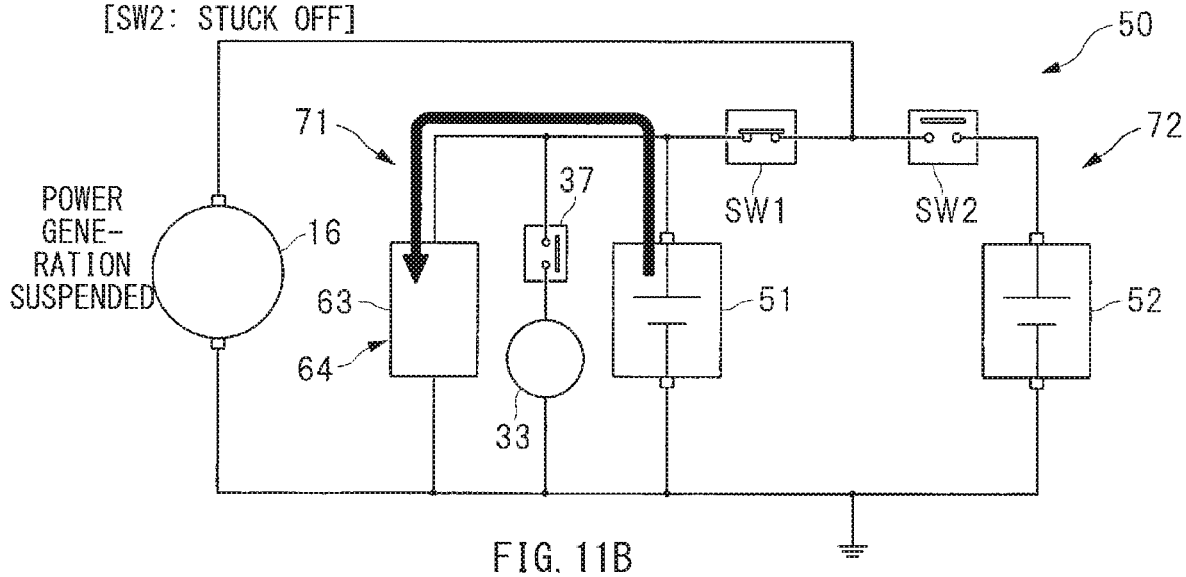

FIG. 10 is a flowchart of an example of an execution procedure in the malfunctioning determination control, part 1. FIGS. 11A and 11B are diagrams of examples of situations as to how currents are supplied, in executing the malfunctioning determination control, part 1. FIG. 11A illustrates the situation in a case where the switch SW2 is normal. FIG. 11B illustrates the situation in a case where the switch SW2 is stuck OFF. It is to be noted that black arrows in FIGS. 11A and 11B indicate how the currents are supplied.

Referring to FIG. 10, in step S10, the ON signal may be transmitted to the switch SW1. In step S11, the ON signal may be transmitted to the switch SW2. In step S12, the power generation suspension signal may be transmitted to the starter generator 16. Thereafter, in step S13, a discharge current $iLi\_d$ to be discharged from the lithium ion battery 52 may be detected. It is to be noted that the discharge current $iLi\_d$ may be detected by the battery controller 75.

In one embodiment of the technology, the discharge current $iLi\_d$ may serve as a "current of the second electrical energy accumulator".

Thereafter, in step S14, a determination may be made as to whether or not the discharge current $iLi\_d$ of the lithium ion battery 52 is smaller than a predetermined threshold $id1$.

In step S14, in a case where a determination is made that the discharge current iLi_d is smaller than the threshold id1 (Y in step S14), the flow may proceed to step S15. In step S15, a determination may be made that the switch SW2 is stuck OFF. Meanwhile, in a case where a determination is made that the discharge current iLi_d is equal to or greater than the threshold id1 (N in step S14), the flow may proceed to step S16. In step S16, a determination may be made that the switch SW2 is in a normal state.

As illustrated in FIG. 11A, in the case where the switch SW2 is normal, the switch SW1 is controlled to the ON state. The switch SW2 is controlled to the ON state. The starter generator 16 is controlled to the power generation suspended state. In this case, the group of the electric devices 64 is coupled to the lithium ion battery 52. Accordingly, the discharge current iLi_d flows from the lithium ion battery 52 to the group of the electric devices 64 in accordance with an operation state of the group of the electric devices 64.

In contrast, as illustrated in FIG. 11B, in the case where the switch SW2 is stuck OFF, the switch SW1 is controlled to the ON state. The switch SW2 is kept at the OFF state. The starter generator 16 is controlled to the power generation suspended state. In this case, the group of the electric devices 64 is isolated from the lithium ion battery 52. Accordingly, the discharge current iLi_d of the lithium ion battery 52 is 0 (zero) A.

In other words, in the case where the switch SW2 is stuck OFF, the discharge current iLi_d of the lithium ion battery 52 becomes smaller than in the case where the switch SW2 is normal. Accordingly, comparing the discharge current iLi_d with the threshold id1 to determine their magnitude relation and grasping how the discharge current iLi_d is decreasing makes it possible to detect that the switch SW2 is stuck OFF. It is to be noted that the threshold id1 may be set on the basis of, for example but not limited to, experiments and simulation so as to grasp how the discharge current iLi_d is decreasing.

(Malfunctioning Determination Control, Part 2)

Figure 12:
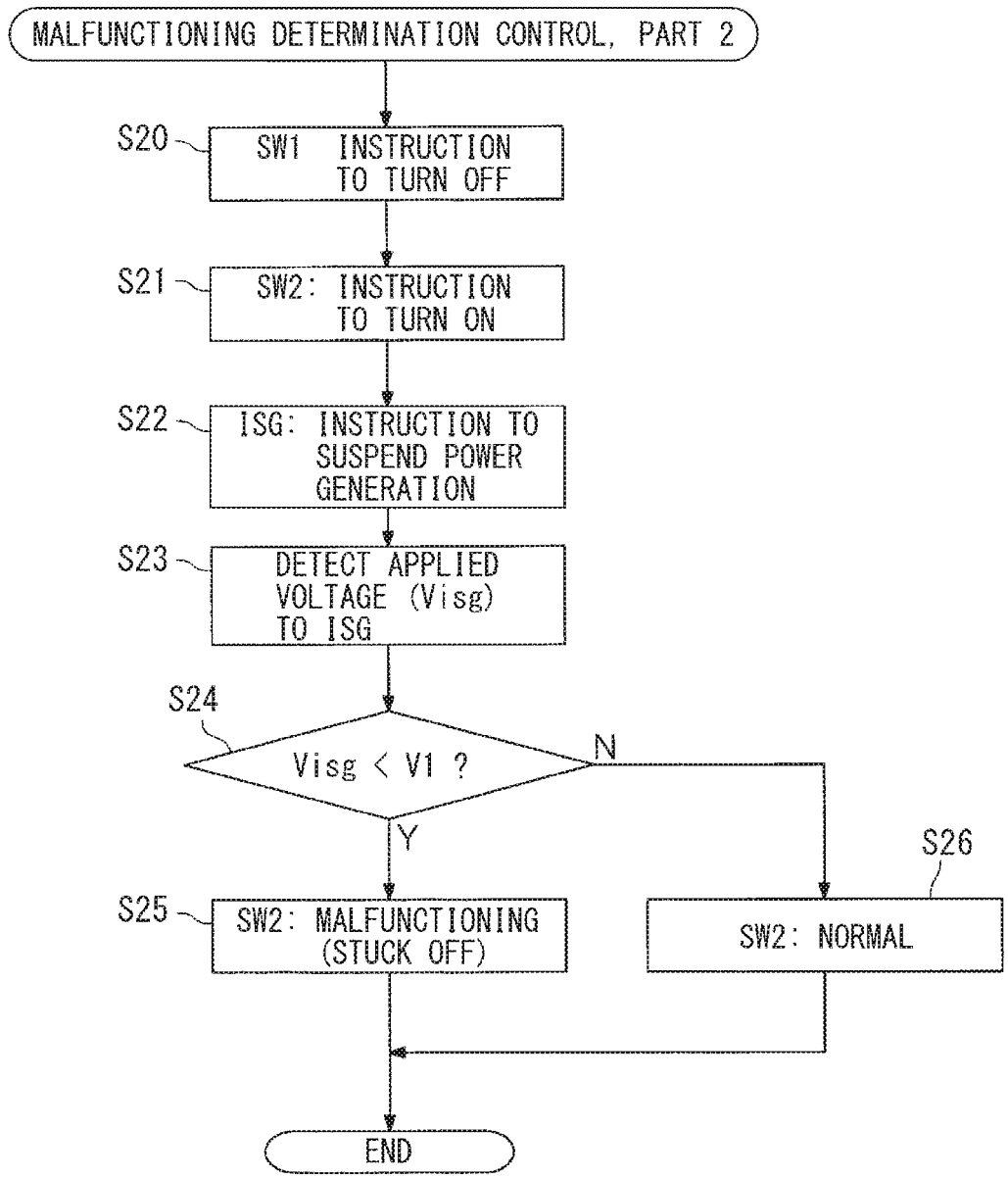
FIG. 12 is a flowchart of an example of an execution procedure in a malfunctioning determination control, part 2.
Figure 13A:
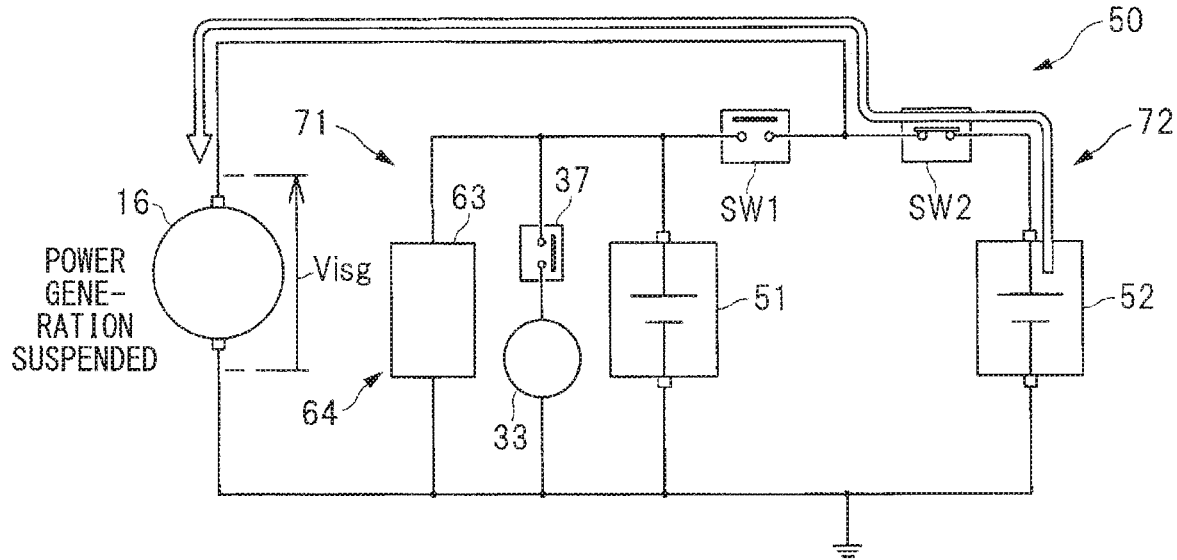
FIGS. 13A and 13B are diagrams of examples of situations as to how voltages are applied, in executing the malfunctioning determination control, part 2.
Figure 13B:
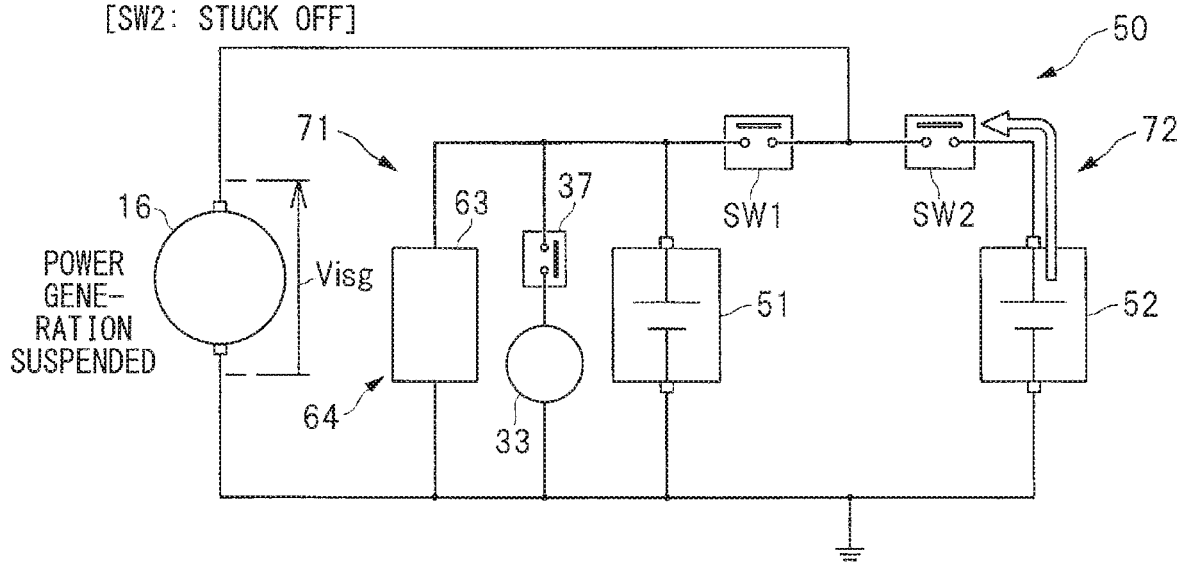

FIG. 12 is a flowchart of an example of an execution procedure in the malfunctioning determination control, part 2. FIGS. 13A and 13B are diagrams of examples of situations as to how voltages are applied, in executing the malfunctioning determination control, part 2. FIG. 13A illustrates the situation in the case where the switch SW2 is normal. FIG. 13B illustrates the situation in the case where the switch SW2 is stuck OFF. It is to be noted that white outlined arrows in FIGS. 13A and 13B indicate how the voltages are applied.

Referring to FIG. 12, in step S20, the OFF signal may be transmitted to the switch SW1. In step S21, the ON signal may be transmitted to the switch SW2. In step S22, the power generation suspension signal may be transmitted to the starter generator 16. Thereafter, in step S23, a terminal voltage Vsig to be applied to the starter generator 16 may be detected. It is to be noted that the terminal voltage Vsig to be applied to the starter generator 16, i.e., an applied voltage Vsig to the starter generator 16, may be detected by the ISG controller 32.

In one embodiment of the technology, the terminal voltage Vsig may serve as a "power generation voltage of the generator motor" and a "voltage of the generator motor".

Thereafter, in step S24, a determination may be made as to whether or not the applied voltage Vsig to the starter generator 16 is smaller than a predetermined threshold V1. In step S24, in a case where a determination is made that the applied voltage Vsig is smaller than the threshold V1 (Y in step S24), the flow may proceed to step S25. In step S25, a determination may be made that the switch SW2 is stuck OFF. Meanwhile, in step S24, in a case where a determination is made that the applied voltage Vsig is equal to or greater than the threshold V1 (N in step S24), the flow may proceed to step S26. In step S26, a determination may be made that the switch SW2 is in the normal state.

As illustrated in FIG. 13A, in the case where the switch SW2 is normal, the switch SW1 is controlled to the OFF state. The switch SW2 is controlled to the ON state. The starter generator 16 is controlled to the power generation suspended state. In this case, the lead battery 51 is isolated from the starter generator 16, while the lithium ion battery 52 is coupled to the starter generator 16. Accordingly, the terminal voltage of the lithium ion battery 52 is applied to the starter generator 16. In other words, the applied voltage Vsig to the starter generator 16 has a voltage value that corresponds to the terminal voltage of the lithium ion battery 52.

In contrast, as illustrated in FIG. 13B, in the case where the switch SW2 is stuck OFF, the switch SW1 is controlled to the OFF state. The switch SW2 is kept at the OFF state. The starter generator 16 is controlled to the power generation suspended state. In this case, both the lead battery 51 and the lithium ion battery 52 are isolated from the starter generator 16. Accordingly, the applied voltage Vsig to the starter generator 16 is 0 (zero) V.

In other words, in the case where the switch SW2 is stuck OFF, the applied voltage Vsig to the starter generator 16 becomes smaller than in the case where the switch SW2 is normal. Accordingly, comparing the applied voltage Vsig with the threshold V1 to determine their magnitude relation and grasping how the applied voltage Vsig is decreasing makes it possible to detect that the switch SW2 is stuck OFF. It is to be noted that the threshold V1 may be set on the basis of, for example but not limited to, experiments and simulation so as to grasp how the applied voltage Vsig is decreasing.

(Malfunctioning Determination Control, Part 3)

Figure 14:
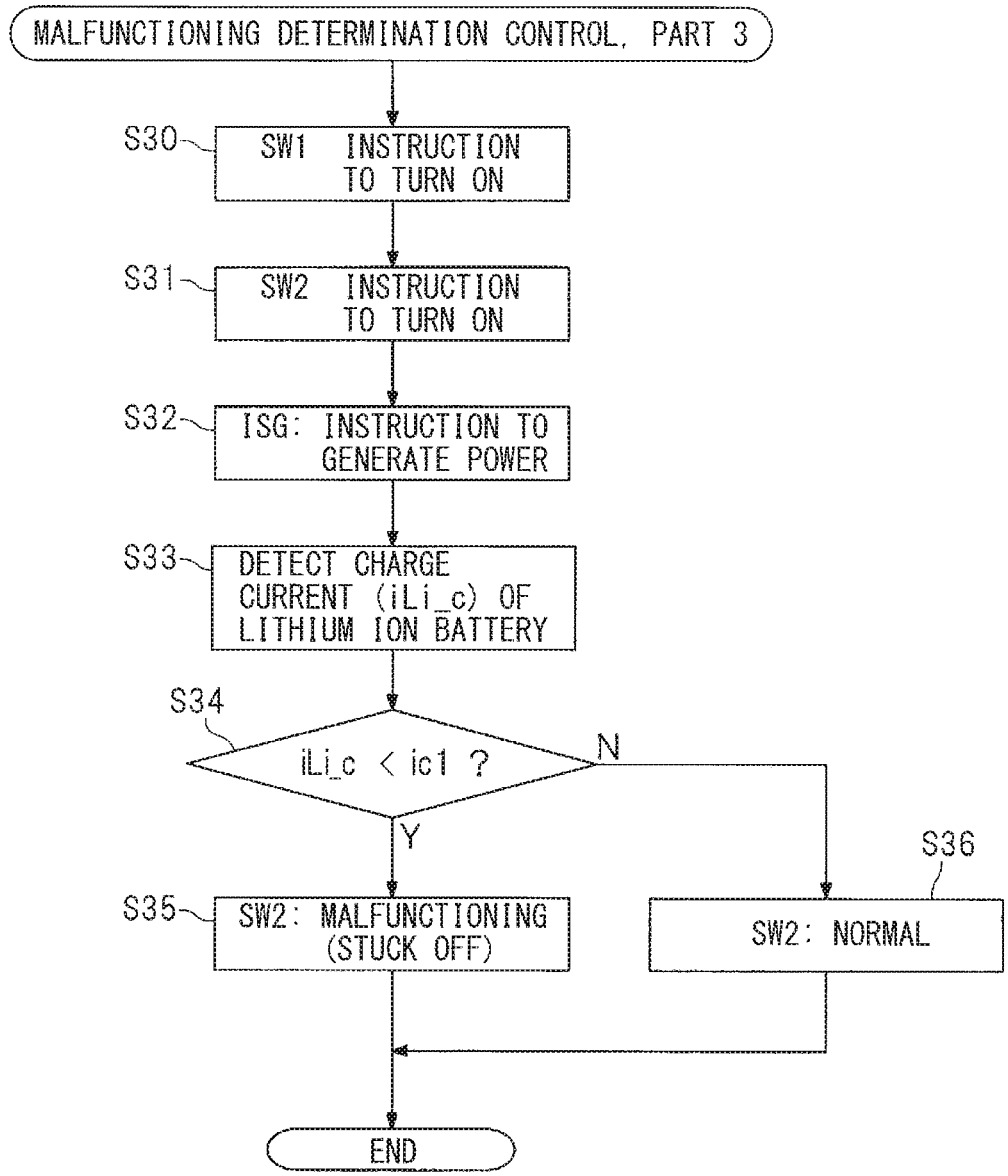
FIG. 14 is a flowchart of an example of an execution procedure in a malfunctioning determination control, part 3.
Figure 15A:
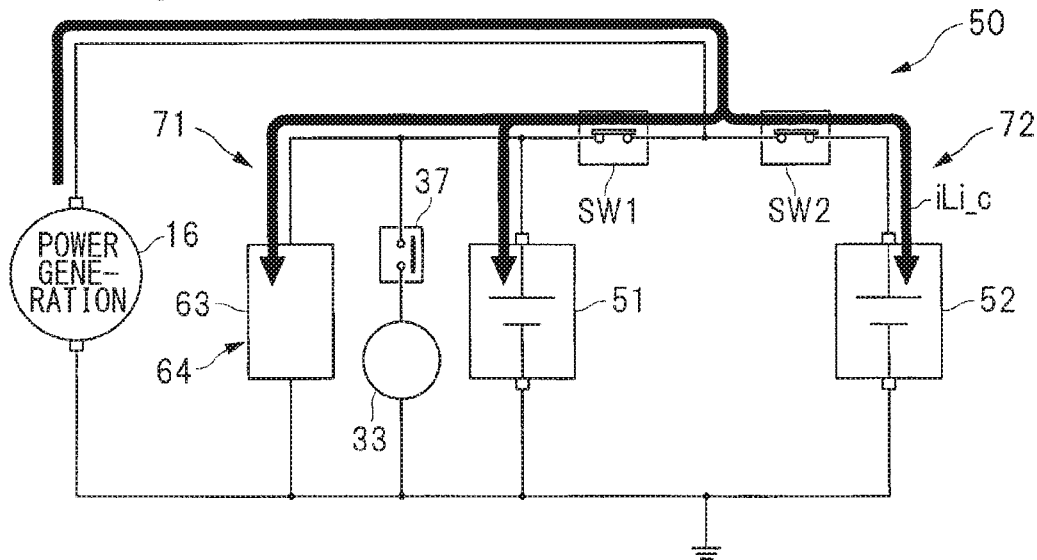
FIGS. 15A and 15B are diagrams of examples of situations as to how currents are supplied, in executing the malfunctioning determination control, part 3.
Figure 15B:
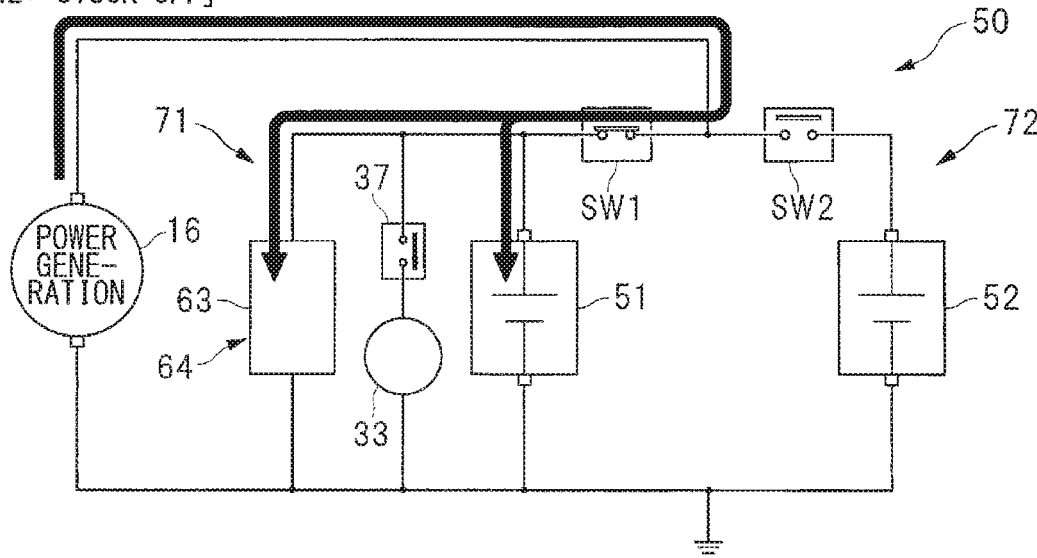

FIG. 14 is a flowchart of an example of an execution procedure in the malfunctioning determination control, part 3. FIGS. 15A and 15B are diagrams of examples of situations as to how currents are supplied, in executing the malfunctioning determination control, part 3. FIG. 15A illustrates the situation in the case where the switch SW2 is normal. FIG. 15B illustrates the situation in the case where the switch SW2 is stuck OFF. It is to be noted that black arrows in FIGS. 15A and 15B indicate how the currents are supplied.

Referring to FIG. 14, in step S30, the ON signal may be transmitted to the switch SW1. In step S31, the ON signal may be transmitted to the switch SW2. In step S32, the power generation signal may be transmitted to the starter generator 16. Thereafter, in step S33, a charge current iLi_c to be charged in the lithium ion battery 52 may be detected. It is to be noted that the charge current iLi_c of the lithium ion battery 52 may be detected by the battery controller 75.

In one embodiment of the technology, the charge current iLi_c may serve as a "current of the second electrical energy accumulator".

Thereafter, in step S34, a determination may be made as to whether or not the charge current iLi_c of the lithium ion battery 52 is smaller than a predetermined threshold ic1. In step S34, in a case where a determination is made that the charge current iLi_c is smaller than the threshold ic1 (Y in step S34), the flow may proceed to step S35. In step S35, a determination may be made that the switch SW2 is stuck OFF. Meanwhile, in step S34, in a case where a determination is made that the charge current iLi_c is equal to or greater than the threshold ic1 (N in step S34), the flow may proceed to step S36. In step S36, a determination may be made that the switch SW2 is in the normal state.

As illustrated in FIG. 15A, in the case where the switch SW2 is normal, the switch SW1 is controlled to the ON state. The switch SW2 is controlled to the ON state. The starter generator 16 is controlled to the power generation state. In this case, the lithium ion battery 52 is coupled to the starter generator 16. Accordingly, the charge current iLi_c flows to the lithium ion battery 52 from the starter generator 16 engaged in the power generation.

In contrast, as illustrated in FIG. 15B, in the case where the switch SW2 is stuck OFF, the switch SW1 is controlled to the ON state. The switch SW2 is kept at the OFF state. The starter generator 16 is controlled to the power generation state. In this case, the lithium ion battery 52 is isolated from the starter generator 16. Accordingly, the charge current iLi_c to be charged in the lithium ion battery 52 is 0 (zero) A.

In other words, in the case where the switch SW2 is stuck OFF, the charge current iLi_c of the lithium ion battery 52 becomes smaller than in the case where the switch SW2 is normal. Accordingly, comparing the charge current iLi_c with the threshold ic1 to determine their magnitude relation and grasping how the charge current iLi_c is decreasing makes it possible to detect that the switch SW2 is stuck OFF. It is to be noted that the threshold ic1 may be set on the basis of, for example but not limited to, experiments and simulation so as to grasp how the charge current iLi_c is decreasing.

The situation that the switch SW1 is controlled to the ON state, the switch SW2 is controlled to the ON state, and the starter generator 16 is controlled to the power generation state may be exemplified by a situation that the starter generator 16 is controlled to the combustion power generation state or the regenerative power generation state, as illustrated in FIGS. 3 and 5. In other words, executing the malfunctioning determination control, part 3, in controlling the starter generator 16 to the combustion power generation state or the regenerative power generation state, makes it possible to detect easily that the switch SW2 is stuck OFF.

(Malfunctioning Determination Control, Part 4)

Figure 16:
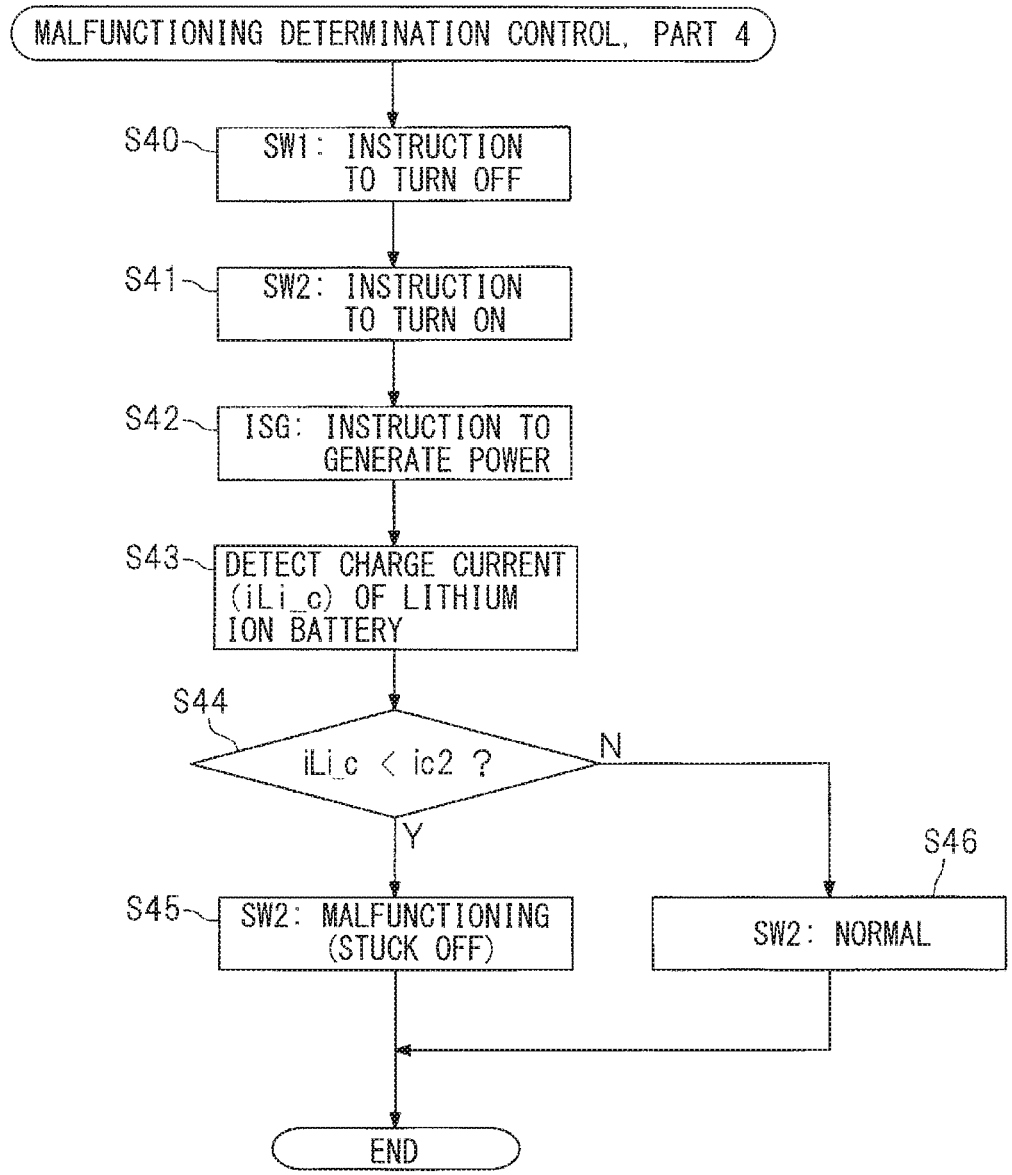
FIG. 16 is a flowchart of an example of an execution procedure in a malfunctioning determination control, part 4.
Figure 17A:
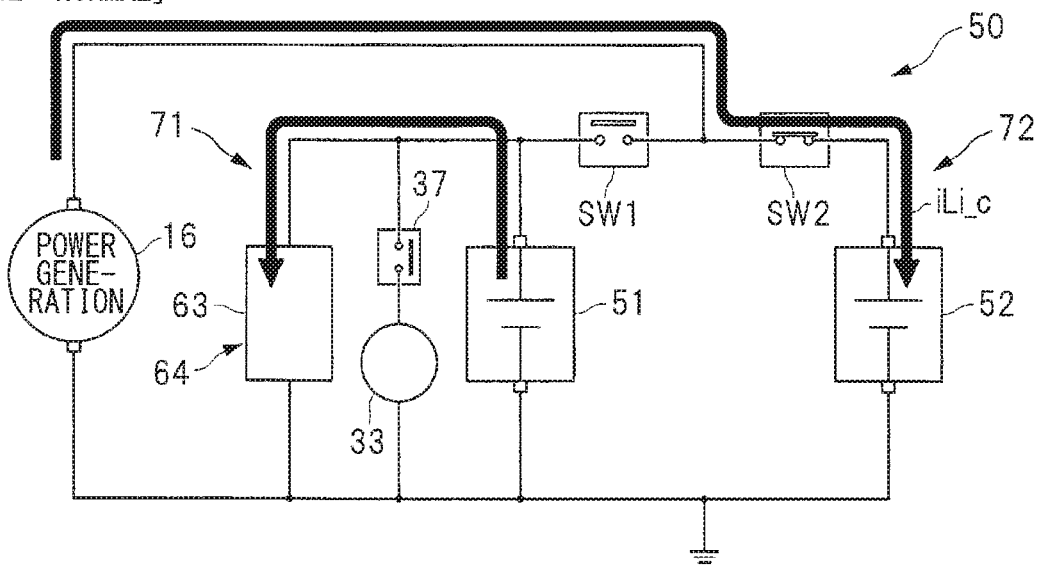
FIGS. 17A and 17B are diagrams of examples of situations as to how currents are supplied, in executing the malfunctioning determination control, part 4.
Figure 17B:
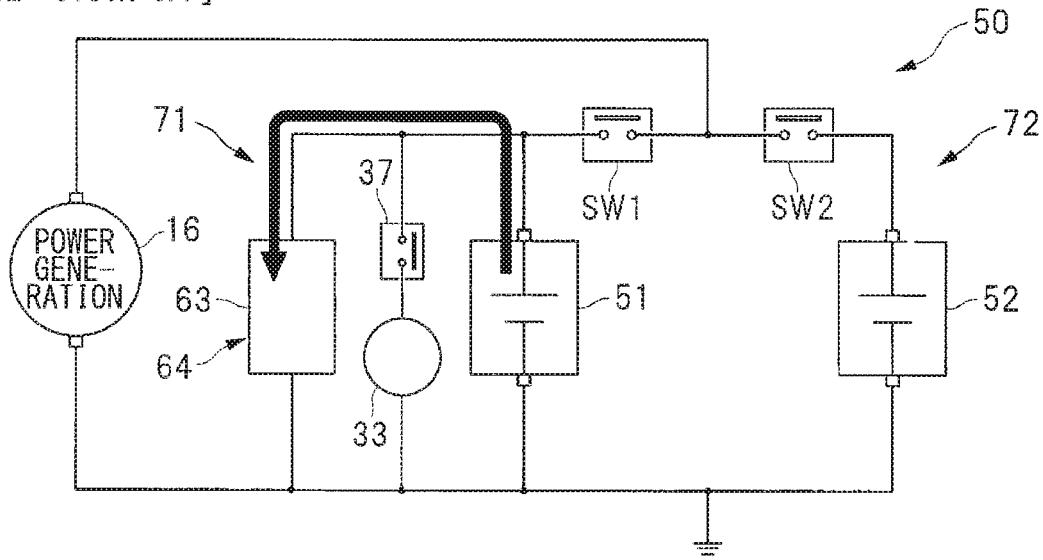

FIG. 16 is a flowchart of an example of an execution procedure in the malfunctioning determination control, part 4. FIGS. 17A and 17B are diagrams of examples of situations as to how currents are supplied, in executing the malfunctioning determination control, part 4. FIG. 17A illustrates the situation in the case where the switch SW2 is normal. FIG. 17B illustrates the situation in the case where the switch SW2 is stuck OFF. It is to be noted that black arrows in FIGS. 17A and 17B indicate how the currents are supplied.

Referring to FIG. 16, in step S40, the OFF signal may be transmitted to the switch SW1. In step S41, the ON signal may be transmitted to the switch SW2. In step S42, the power generation signal may be transmitted to the starter generator 16. Thereafter, in step S43, the charge current iLi_c to be charged in the lithium ion battery 52 may be detected. It is to be noted that the charge current iLi_c of the lithium ion battery 52 may be detected by the battery controller 75.

In one embodiment of the technology, the charge current iLi_c may serve as a "current of the second electrical energy accumulator".

Thereafter, in step S44, a determination may be made as to whether or not the charge current iLi_c of the lithium ion battery 52 is smaller than a predetermined threshold ic2. In step S44, in a case where a determination is made that the charge current iLi_c is smaller than the threshold ic2 (Y in step S44), the flow may proceed to step S45. In step S45, a determination may be made that the switch SW2 is stuck OFF. Meanwhile, in step S44, in a case where a determination is made that the charge current iLi_c is equal to or greater than the threshold ic2 (N in step S44), the flow may proceed to step S46. In step S46, a determination may be made that the switch SW2 is in the normal state.

As illustrated in FIG. 17A, in the case where the switch SW2 is normal, the switch SW1 is controlled to the OFF state. The switch SW2 is controlled to the ON state. The starter generator 16 is controlled to the power generation state. In this case, the lithium ion battery 52 is coupled to the starter generator 16. Accordingly, the charge current iLi_c flows to the lithium ion battery 52 from the starter generator 16 engaged in the power generation.

In contrast, as illustrated in FIG. 17B, in the case where the switch SW2 is stuck OFF, the switch SW1 is controlled to the OFF state. The switch SW2 is kept at the OFF state. The starter generator 16 is controlled to the power generation state. In this case, the lithium ion battery 52 is isolated from the starter generator 16. Accordingly, the charge current iLi_c to be charged in the lithium ion battery 52 is 0 (zero) A.

In other words, in the case where the switch SW2 is stuck OFF, the charge current iLi_c of the lithium ion battery 52 becomes smaller than in the case where the switch SW2 is normal. Accordingly, comparing the charge current iLi_c with the threshold ic2 to determine their magnitude relation and grasping how the charge current iLi_c is decreasing makes it possible to detect that the switch SW2 is stuck OFF. It is to be noted that the threshold ic2 may be set on the basis of, for example but not limited to, experiments and simulation so as to grasp how the charge current iLi_c is decreasing.

(Malfunctioning Determination Control, Part 5)

Figure 18:
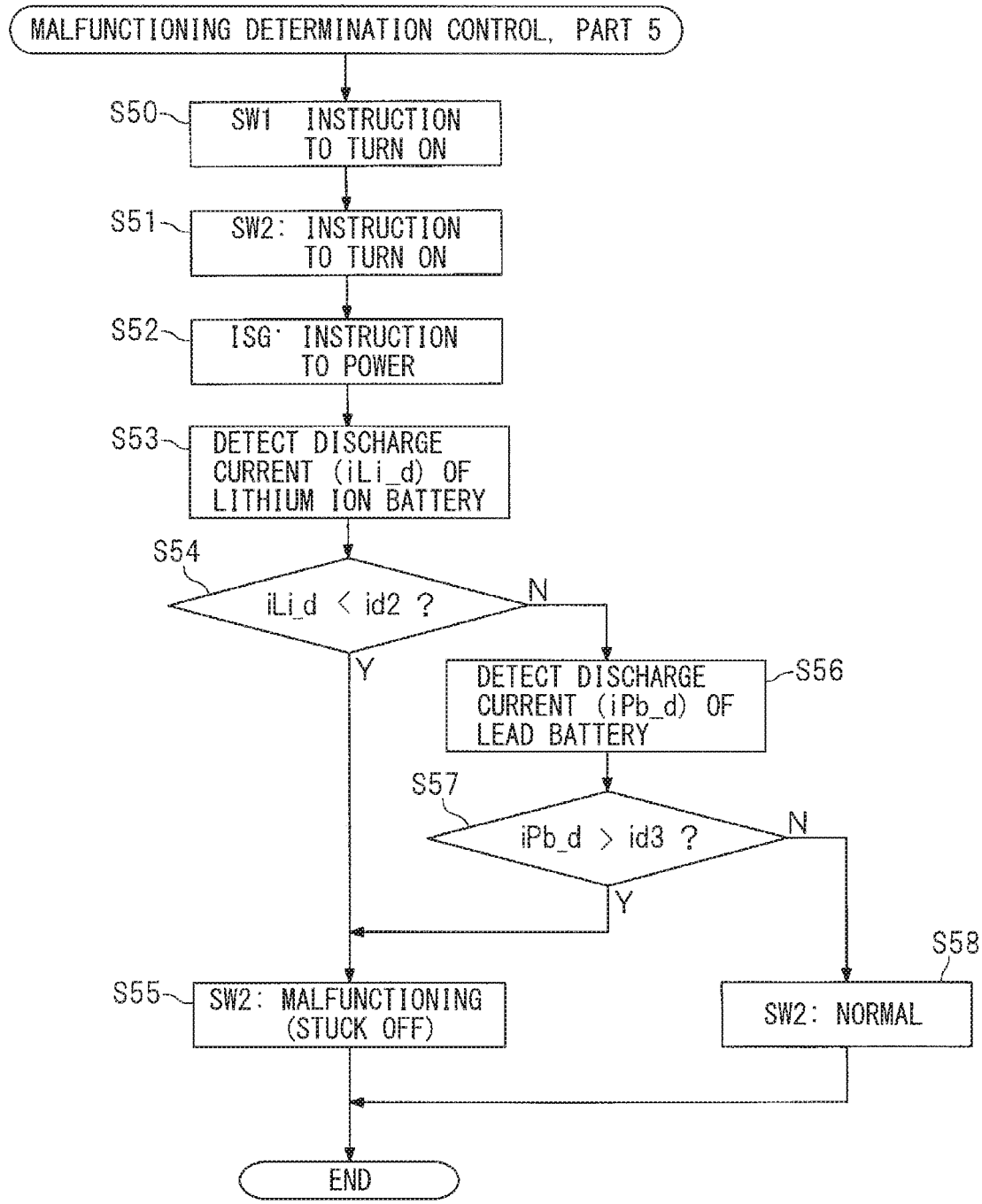
FIG. 18 is a flowchart of an example of an execution procedure in a malfunctioning determination control, part 5.

FIG. 18 is a flowchart of an example of an execution procedure in the malfunctioning determination control, part 5. FIGS. 19A and 19B are diagrams of examples of situations as to how currents are supplied, in executing the malfunctioning determination control, part 5 or the malfunctioning determination control, part 6 described later. FIG. 19A illustrates the situation in the case where the switch SW2 is normal. FIG. 19B illustrates the situation in the case where the switch SW2 is stuck OFF. It is to be noted that black arrows in FIGS. 19A and 19B indicate how the currents are supplied.

Referring to FIG. 18, in step S50, the ON signal may be transmitted to the switch SW1. In step S51, the ON signal may be transmitted to the switch SW2. In step S52, the powering signal may be transmitted to the starter generator 16. Thereafter, in step S53, a discharge current iLi_d to be discharged from the lithium ion battery 52 may be detected. It is to be noted that the discharge current iLi_d of the lithium ion battery 52 may be detected by the battery controller 75. Thereafter, in step S54, a determination may be made as to whether or not the discharge current iLi_d of the lithium ion battery 52 is smaller than a predetermined threshold id2. In step S54, in a case where a determination is made that the discharge current iLi_d is smaller than the threshold id2 (Y in step S54), the flow may proceed to step S55. In step S55, a determination may be made that the switch SW2 is stuck OFF.

In one embodiment of the technology, the discharge current iLi_d may serve as a "current of the second electrical energy accumulator".

Meanwhile, in step S54, in a case where a determination is made that the discharge current iLi_d is equal to or greater than the threshold id2 (N in step S54), the flow may proceed to step S56. In step S56, a discharge current iPb_d to be discharged from the lead battery 51 may be detected. It is to be noted that the discharge current iPb_d of the lead battery 51 may be detected by the battery sensor 65. Thereafter, in step S57, a determination may be made as to whether or not the discharge current iPb_d of the lead battery 51 is greater than a predetermined threshold id3. In step S57, in a case where a determination is made that the discharge current iPb_d is greater than the threshold id3 (Y in step S57), the flow may proceed to step S55. In step S55, a determination may be made that the switch SW2 is stuck OFF.

In one embodiment of the technology, the discharge current iPb_d may serve as a "current of the first electrical energy accumulator".

As described, in step S54, in the case where the determination is made that the discharge current iLi_d of the lithium ion battery 52 is smaller than the threshold id2 (Y in step S54), or in step S57, in the case where the determination is made that the discharge current iPb_d of the lead battery 51 is greater than the threshold id3 (Y in step S57), the flow may proceed to step S55. In step S55, the determination may be made that the switch SW2 is stuck OFF. Meanwhile, in a case where in step S54, a determination is made that the discharge current iLi_d of the lithium ion battery 52 is equal to or greater than the threshold id2 and in step S57, a determination is made that the discharge current iPb_d of the lead battery 51 is equal to or smaller than the threshold id3 (N in step S54 and N in step S57), the flow may proceed to step S58. In step S58, a determination may be made that the switch SW2 is in the normal state.

As illustrated in FIG. 19A, in the case where the switch SW2 is normal, the switch SW1 is controlled to the ON state. The switch SW2 is controlled to the ON state. The starter generator 16 is controlled to the powering state. In this case, the lithium ion battery 52 is coupled to the starter generator 16. Accordingly, the discharge current iLi_d flows from the lithium ion battery 52 to the starter generator 16 engaged in powering.

In contrast, as illustrated in FIG. 19B, in the case where the switch SW2 is stuck OFF, the switch SW1 is controlled to the ON state. The switch SW2 is kept at the OFF state. The starter generator 16 is controlled to the powering state. In this case, the lithium ion battery 52 is isolated from the starter generator 16. Accordingly, the discharge current iLi_d of the lithium ion battery 52 is 0 (zero) A.

In other words, in the case where the switch SW2 is stuck OFF, the discharge current iLi_d of the lithium ion battery 52 becomes smaller than in the case where the switch SW2 is normal. Accordingly, comparing the discharge current iLi_d with the threshold id2 to determine their magnitude relation and grasping how the discharge current iLi_d is decreasing makes it possible to detect that the switch SW2 is stuck OFF. It is to be noted that the threshold id2 may be set on the basis of, for example but not limited to, experiments and simulation so as to grasp how the discharge current iLi_d is decreasing.

Moreover, as illustrated in FIG. 19A, in the case where the switch SW2 is normal, the switch SW1 is controlled to the ON state. The switch SW2 is controlled to the ON state. The starter generator 16 is controlled to the powering state. In this case, the lead battery 51 and the lithium ion battery 52 are coupled to the starter generator 16 engaged in the powering. Accordingly, the discharge current iPb_d flows from the lead battery 51 to the starter generator 16, while the discharge current iLi_d flows from the lithium ion battery 52 to the starter generator 16. In other words, the starter generator 16 engaged in the powering is provided with current supply from both the lead battery 51 and the lithium ion battery 52.

In contrast, as illustrated in FIG. 19B, in the case where the switch SW2 is stuck OFF, the switch SW1 is controlled to the ON state. The switch SW2 is kept at the OFF state. The starter generator 16 is controlled to the powering state. In this case, solely the lead battery 51 is coupled to the starter generator 16 engaged in the powering. Accordingly, the discharge current iPb_d flows from the lead battery 51 to the starter generator 16. In other words, the starter generator 16 engaged in the powering is provided with current supply solely from the lead battery 51.

As described, in the case where the switch SW2 is normal, the starter generator 16 is provided with the current supply from both the lead battery 51 and the lithium ion battery 52. Accordingly, the discharge current iPb_d of the lead battery 51 tends to decrease. Meanwhile, in the case where the switch SW2 is stuck OFF, the starter generator 16 is provided with the current supply solely from the lead battery 51. Accordingly, the discharge current iPb_d of the lead battery 51 tends to increase.

In other words, in the case where the switch SW2 is stuck OFF, the discharge current iPb_d of the lead battery 51 becomes greater than in the case where the switch SW2 is normal. Accordingly, comparing the discharge current iPb_d with the threshold id3 to determine their magnitude relation and grasping how the discharge current iPb_d is increasing makes it possible to detect that the switch SW2 is stuck OFF. It is to be noted that the threshold id3 may be set on the basis of, for example but not limited to, experiments and simulation so as to grasp how the discharge current iPb_d is increasing.

The situation that the switch SW1 is controlled to the ON state, the switch SW2 is controlled to the ON state, and the starter generator 16 is controlled to the powering state may be exemplified by a situation that the motor assistance control is executed, as illustrated in FIG. 7. In other words, executing the malfunctioning determination control, part 5, in executing the motor assistance control, makes it possible to detect easily that the switch SW2 is stuck OFF.

(Malfunctioning Determination Control, Part 6)

In the malfunctioning determination control, part 6 illustrated in FIG. 18, the determination is made that the switch SW2 is stuck OFF in the case where the discharge current iLi_d of the lithium ion battery 52 is smaller than the threshold id2 (Y in step S54), or in the case where the discharge current iPb_d of the lead battery 51 is greater than the threshold id3 (Y in step S57). However, this is non-limiting. In the following, described is the malfunctioning determination control, part 6 in which the determination is made that the switch SW2 is stuck OFF in a case where the discharge current iLi_d of the lithium ion battery 52 is smaller than the threshold id2 and the discharge current iPb_d of the lead battery 51 is greater than the threshold id3 (Y in step S54 and Y in step S57).

Figure 20:
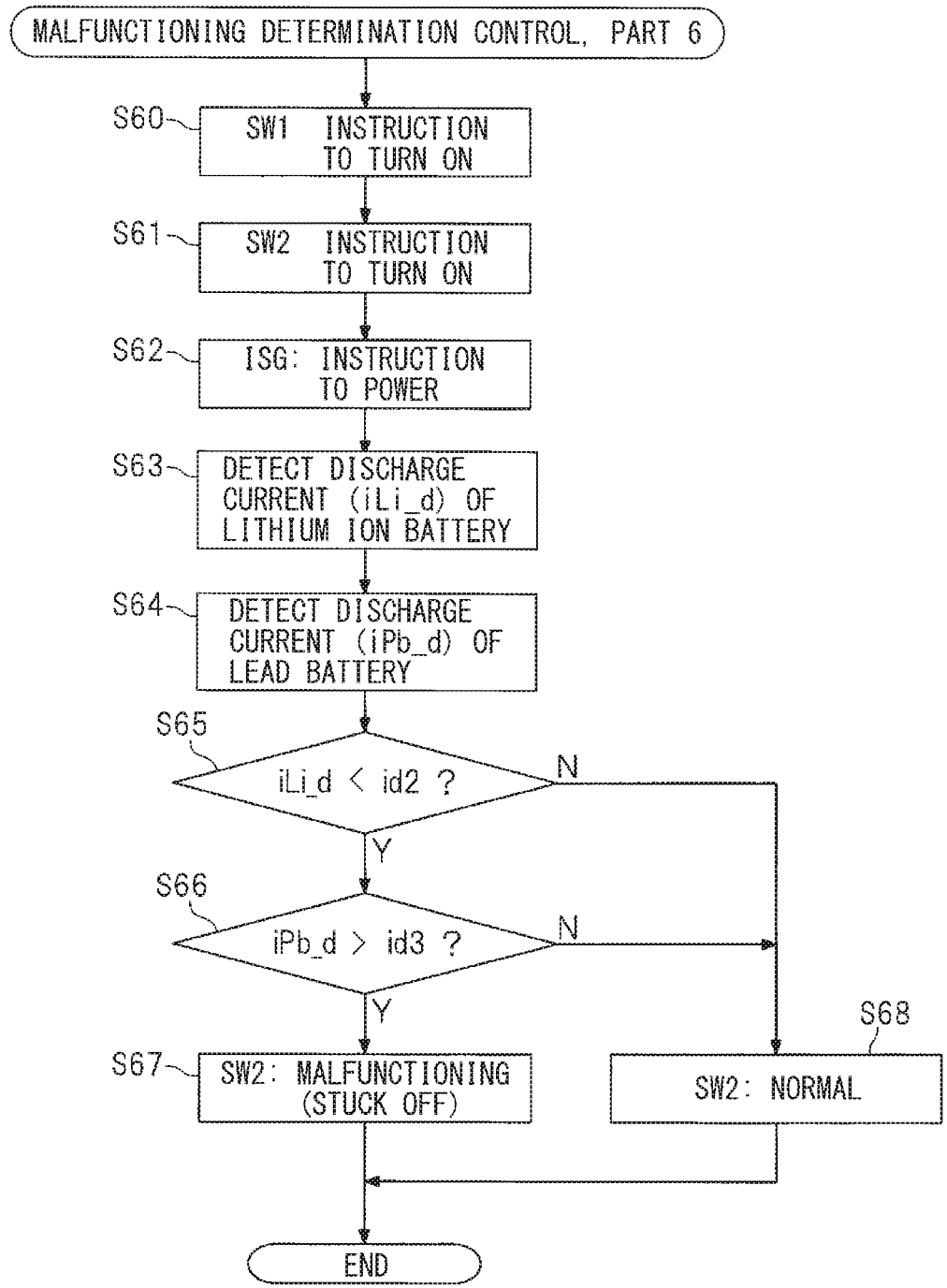
FIG. 20 is a flowchart of an example of an execution procedure in the malfunctioning determination control, part 6.

FIG. 20 is a flowchart of an example of an execution procedure in the malfunctioning determination control, part 6. Referring to FIG. 20, in step S60, the ON signal may be transmitted to the switch SW1. In step S61, the ON signal may be transmitted to the switch SW2. In step S62, the powering signal may be transmitted to the starter generator 16.

Thereafter, in step S63, the discharge current iLi_d to be discharged from the lithium ion battery 52 may be detected. In step S64, the discharge current iPb_d to be discharged from the lead battery 51 may be detected. It is to be noted that the discharge current iLi_d of the lithium ion battery 52 may be detected by the battery controller 75. The discharge current iPb_d of the lead battery 51 may be detected by the battery sensor 65.

In one embodiment of the technology, the discharge current iLi_d may serve as a "current of the second electrical energy accumulator", and the discharge current iPb_d may serve as a "current of the first electrical energy accumulator".

Thereafter, in step S65, a determination may be made as to whether or not the discharge current iLi_d of the lithium ion battery 52 is smaller than the predetermined threshold id2. In step S65, in a case where a determination is made that the discharge current iLi_d is smaller than the threshold id2 (Y in step S65), the flow may proceed to step S66. In step S66, a determination may be made as to whether or not the discharge current iPb_d of the lead battery 51 is greater than the predetermined threshold id3. In step S66, in a case where a determination is made that the discharge current iPb_d is greater than the threshold id3 (Y in step S66), the flow may proceed to step S67. In step S67, a determination may be made that the switch SW2 is stuck OFF.

As described, in the case where in step S65, the determination is made that the discharge current iLi_d of the lithium ion battery 52 is smaller than the threshold id2, and in step S66, the determination is made that the discharge current iPb_d of the lead battery 51 is greater than the threshold id3 (Y in step S65 and Y in step S66), the flow may proceed to step S67. In step S67, the determination may be made that the switch SW2 is stuck OFF. Meanwhile, in step S65, in a case where a determination is made that the discharge current iLi_d is equal to or greater than the threshold id2 (N in step S65), or in step S66, in a case where a determination is made that the discharge current iPb_d is equal to or smaller than the threshold id3 (N in step S66), the flow may proceed to step S68. In step S68, a determination may be made that the switch SW2 is in the normal state.

As illustrated in FIG. 19A mentioned above, in the case where the switch SW2 is normal, the switch SW1 is controlled to the ON state. The switch SW2 is controlled to the ON state. The starter generator 16 is controlled to the powering state. In this case, both the lead battery 51 and the lithium ion battery 52 are coupled to the starter generator 16 engaged in the powering. Accordingly, the discharge current iPb_d flows from the lead battery 51 to the starter generator 16, while the discharge current iLi_d flows from the lithium ion battery 52 to the starter generator 16.

In contrast, as illustrated in FIG. 19B, in the case where the switch SW2 is stuck OFF, the switch SW1 is controlled to the ON state. The switch SW2 is kept at the OFF state. The starter generator 16 is controlled to the powering state. In this case, the lead battery 51 is coupled to the starter generator 16 engaged in the powering, while the lithium ion battery 52 is isolated from the starter generator 16 engaged in the powering. Accordingly, the discharge current iPb_d flows from the lead battery 51 to the starter generator 16, while the discharge current iLi_d from the lithium ion battery 52 to the starter generator 16 is cut off.

In other words, in the case where the switch SW2 is stuck OFF, the discharge current iLi_d of the lithium ion battery 52 becomes smaller than in the case where the switch SW2 is normal, while the discharge current iPb_d of the lead battery 51 becomes greater than in the case where the switch SW2 is normal. Accordingly, comparing the discharge current iLi_d with the threshold id2 to determine their magnitude relation and grasping how the discharge current iLi_d is decreasing, and comparing the discharge current iPb_d with the threshold id3 to determine their magnitude relation and grasping how the discharge current iPb_d is increasing make it possible to detect that the switch SW2 is stuck OFF. It is to be noted that the threshold id2 may be set on the basis of, for example but not limited to, experiments and simulation so as to grasp how the discharge current iLi_d is decreasing. It is to be noted that the threshold id3 may be set on the basis of, for example but not limited to, experiments and simulation so as to grasp how the discharge current iPb_d is increasing.

The situation that the switch SW1 is controlled to the ON state, the switch SW2 is controlled to the ON state, and the starter generator 16 is controlled to the powering state may be exemplified by the situation that the motor assistance control is executed, as illustrated in FIG. 7. In other words, executing the malfunctioning determination control, part 6, in executing the motor assistance control, makes it possible to detect easily that the switch SW2 is stuck OFF.

(Malfunctioning Determination Control, Part 7)

Figure 21:
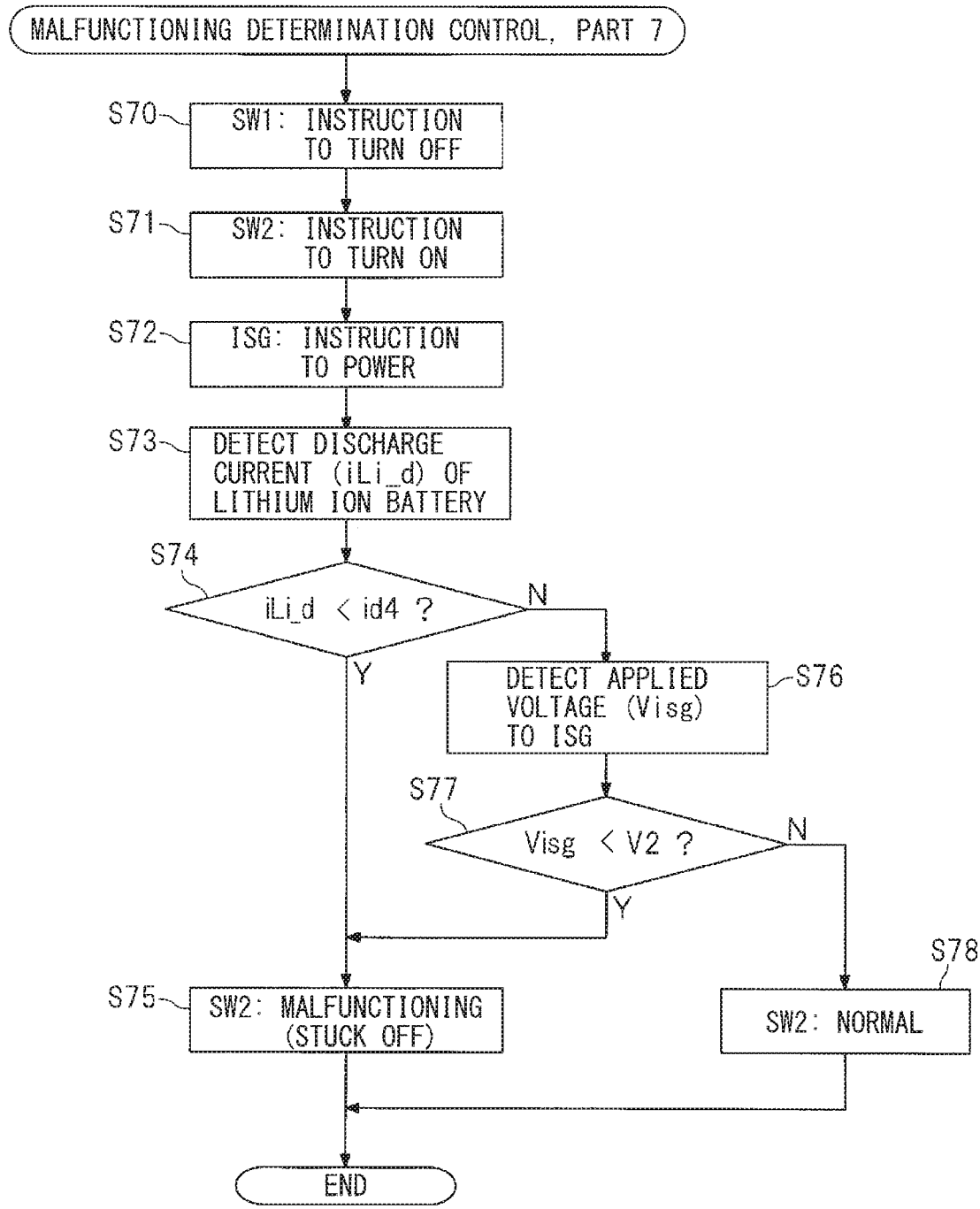
FIG. 21 is a flowchart of an example of an execution procedure in a malfunctioning determination control, part 7.
Figure 22A:
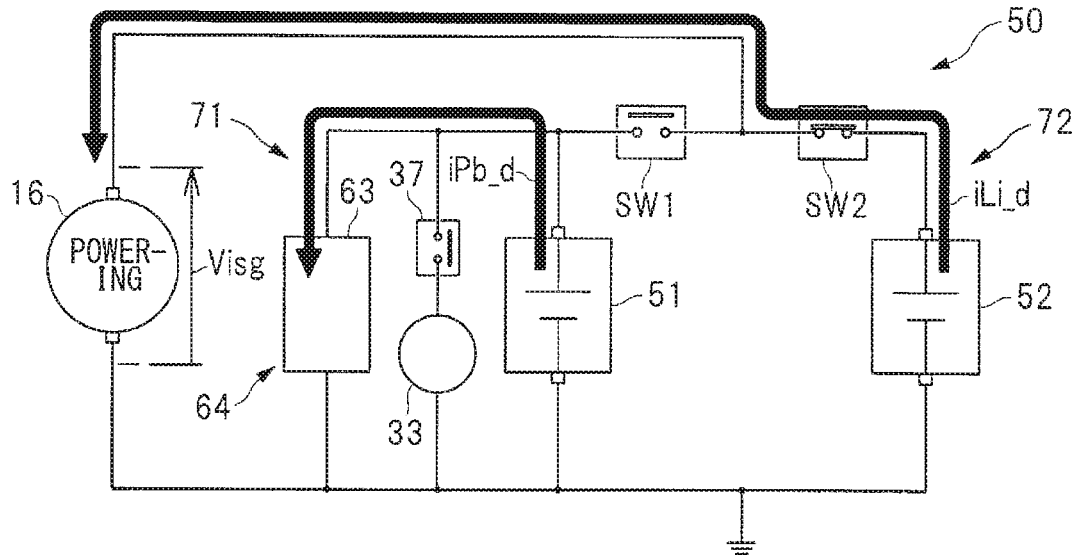
FIGS. 22A and 22B are diagrams of examples of situations as to how currents are supplied, in executing the malfunctioning determination control, part 7 or a malfunctioning determination control, part 8.
Figure 22B:
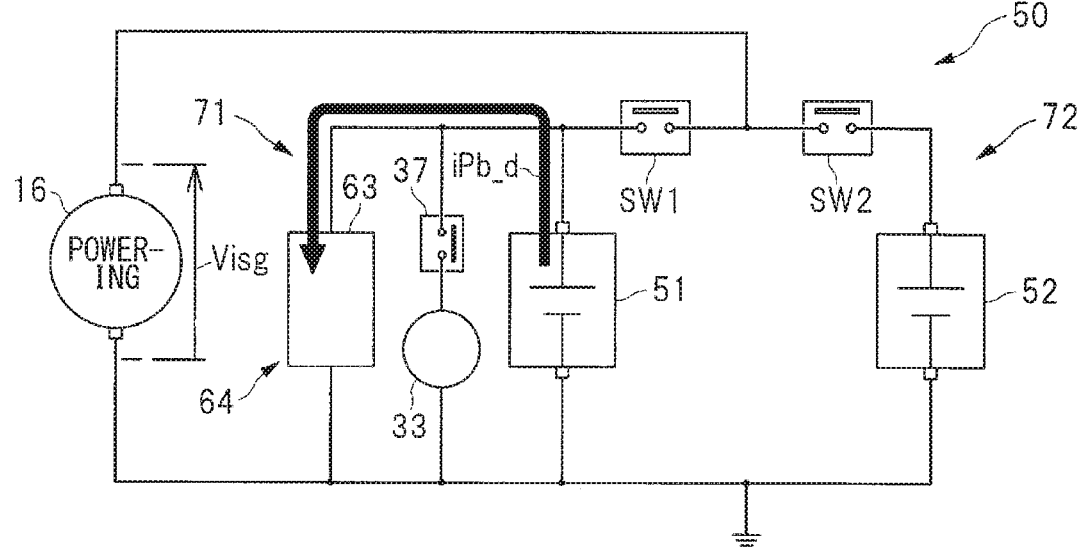

FIG. 21 is a flowchart of an example of an execution procedure in the malfunctioning determination control, part 7. FIGS. 22A and 22B are diagrams of examples of situations as to how currents are supplied, in executing the malfunctioning determination control, part 7 or the malfunctioning determination control, part 8 described later. FIG. 22A illustrates the situation in the case where the switch SW2 is normal. FIG. 22B illustrates the situation in the case where the switch SW2 is stuck OFF. It is to be noted that black arrows in FIGS. 22A and 22B indicate how the currents are supplied.

Referring to FIG. 21, in step S70, the OFF signal may be transmitted to the switch SW1. In step S71, the ON signal may be transmitted to the switch SW2. In step S72, the powering signal may be transmitted to the starter generator 16. Thereafter, in step S73, the discharge current iLi_d to be discharged from the lithium ion battery 52 may be detected. It is to be noted that the discharge current iLi_d of the lithium ion battery 52 may be detected by the battery controller 75. Thereafter, in step S74, a determination may be made as to whether or not the discharge current iLi_d of the lithium ion battery 52 is smaller than a predetermined threshold id4. In step S74, in a case where a determination is made that the discharge current iLi_d is smaller than the threshold id4 (Y in step S74), the flow may proceed to step S75. In step S75, a determination may be made that the switch SW2 is stuck OFF.

In one embodiment of the technology, the discharge current iLi_d may serve as a "current of the second electrical energy accumulator".

Meanwhile, in step S74, in a case where a determination is made that the discharge current iLi_d is equal to or greater than the threshold id4 (N in step S74), the flow may proceed to step S76. In step S76, the terminal voltage Visg to be applied to the starter generator 16 may be detected. It is to be noted that the terminal voltage Visg to be applied to the starter generator 16, i.e., the applied voltage Visg to the starter generator 16, may be detected by the ISG controller 32. Thereafter, in step S77, a determination may be made as to whether or not the applied voltage Visg to the starter generator 16 is smaller than a predetermined threshold V2.

In step S77, in a case where a determination is made that the applied voltage Visg is smaller than the threshold V2 (Y in step S77), the flow may proceed to step S75. In step S75, a determination may be made that the switch SW2 is stuck OFF.

In one embodiment of the technology, the terminal voltage Visg may serve as a "power generation voltage of the generator motor" and a "voltage of the generator motor".

Thus, in step S74, in the case where the determination is made that the discharge current iLi_d of the lithium ion battery 52 is smaller than the threshold id4 (Y in step S74), or in step S77, in the case where the determination is made that the applied voltage Visg to the starter generator 16 is smaller than the threshold V2 (Y in step S77), the flow may proceed to step S75. In step S75, the determination may be made that the switch SW2 is stuck OFF. Meanwhile, in a case where in step S74, a determination is made that the discharge current iLi_d of the lithium ion battery 52 is equal to or greater than the threshold id4, and in step S77, a determination is made that the applied voltage Visg to the starter generator 16 is equal to or greater than the threshold V2 (N in step S74 and N in step S77), the flow may proceed to step S78. In step S78, a determination may be made that the switch SW2 is in the normal state.

As illustrated in FIG. 22A, in the case where the switch SW2 is normal, the switch SW1 is controlled to the OFF state. The switch SW2 is controlled to the ON state. The starter generator 16 is controlled to the powering state. In this case, the lithium ion battery 52 is coupled to the starter generator 16. Accordingly, the discharge current iLi_d flows from the lithium ion battery 52 to the starter generator 16 engaged in the powering.

In contrast, as illustrated in FIG. 22B, in the case where the switch SW2 is stuck OFF, the switch SW1 is controlled to the OFF state. The switch SW2 is kept at the OFF state. The starter generator 16 is controlled to the powering state. In this case, the lithium ion battery 52 is isolated from the starter generator 16. Accordingly, the discharge current iLi_d of the lithium ion battery 52 is 0 (zero) A.

In other words, in the case where the switch SW2 is stuck OFF, the discharge current iLi_d of the lithium ion battery 52 becomes smaller than in the case where the switch SW2 is normal. Accordingly, comparing the discharge current iLi_d with the threshold id4 to determine their magnitude relation and grasping how the discharge current iLi_d is decreasing makes it possible to detect that the switch SW2 is stuck OFF. It is to be noted that the threshold id4 may be set on the basis of, for example but not limited to, experiments and simulation so as to grasp how the discharge current iLi_d is decreasing.

As illustrated in FIG. 22A, in the case where the switch SW2 is normal, the switch SW1 is controlled to the OFF state. The switch SW2 is controlled to the ON state. The starter generator 16 is controlled to the powering state. In this case, the lead battery 51 is isolated from the starter generator 16, while the lithium ion battery 52 is coupled to the starter generator 16. Accordingly, the terminal voltage of the lithium ion battery 52 is applied to the starter generator 16. That is, the applied voltage Visg to the starter generator 16 is a voltage value that corresponds to the terminal voltage of the lithium ion battery 52.

In contrast, as illustrated in FIG. 22B, in the case where the switch SW2 is stuck OFF, the switch SW1 is controlled to the OFF state. The switch SW2 is kept at the OFF state. The starter generator 16 is controlled to the powering state. In this case, both the lead battery 51 and the lithium ion battery 52 are isolated from the starter generator 16. Accordingly, the applied voltage Visg to the starter generator 16 is 0 (zero) V.

In other words, in the case where the switch SW2 is stuck OFF, the applied voltage Visg to the starter generator 16 becomes smaller than in the case where the switch SW2 is normal. Accordingly, comparing the applied voltage Visg with the threshold V2 to determine their magnitude relation and grasping how the applied voltage Visg is decreasing makes it possible to detect that the switch SW2 is stuck OFF. It is to be noted that the threshold V2 may be set on the basis of, for example but not limited to, experiments and simulation so as to grasp how the applied voltage Visg is decreasing.

The situation that the switch SW1 is controlled to the OFF state, the switch SW2 is controlled to the ON state, and the starter generator 16 is controlled to the powering state may be exemplified by the situation that the engine 12 is restarted in the idling stop control, as illustrated in FIG. 6. In other words, executing the malfunctioning determination control, part 7, in restarting the engine 12 in the idling stop control, makes it possible to detect easily that the switch SW2 is stuck OFF.

(Malfunctioning Determination Control, Part 8)

In the malfunctioning determination control, part 7, illustrated in FIG. 21, the determination is made that the switch SW2 is stuck OFF in the case where the discharge current iLi_d of the lithium ion battery 52 is smaller than the threshold id4 (Y in step S74), or in the case where the applied voltage Visg to the starter generator 16 is smaller than the threshold V2 (Y in step S77). However, this is non-limiting. In what follows, described is the malfunctioning determination control, part 8. In the malfunctioning determination control, part 8, the determination is made that the switch SW2 is stuck OFF in a case where the discharge current iLi_d of the lithium ion battery 52 is smaller than the threshold id4, and the applied voltage Visg to the starter generator 16 is smaller than the threshold V2.

Figure 23:
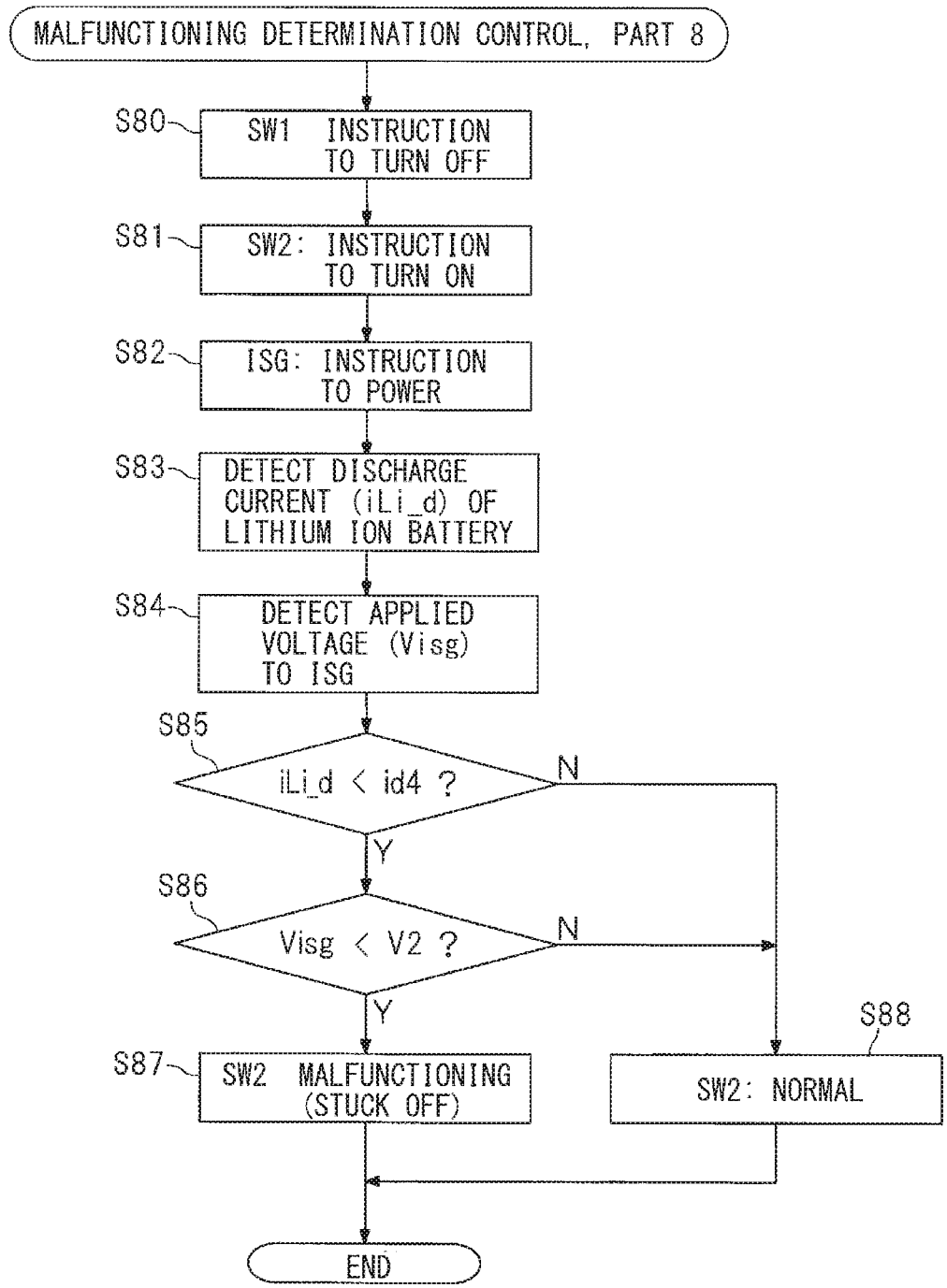
FIG. 23 is a flowchart of an example of an execution procedure in the malfunctioning determination control, part 8.

FIG. 23 is a flowchart of an example of an execution procedure in the malfunctioning determination control, part 8. Referring to FIG. 23, in step S80, the OFF signal may be transmitted to the switch SW1. In step S81, the ON signal may be transmitted to the switch SW2. In step S82, the powering signal may be transmitted to the starter generator 16.

Thereafter, in step S83, the discharge current iLi_d to be discharged from the lithium ion battery 52 may be detected. In step S84, the terminal voltage Vsig to be applied to the starter generator 16 may be detected. It is to be noted that the discharge current iLi_d of the lithium ion battery 52 may be detected by the battery controller 75. It is to be noted that the terminal voltage Vsig to be applied to the starter generator 16, i.e., the applied voltage Visg to the starter generator 16, may be detected by the ISG controller 32.

In one embodiment of the technology, the discharge current iLi_d may serve as a "current of the second electrical energy accumulator". In one embodiment of the technology, the terminal voltage Visg may serve as a "power generation voltage of the generator motor" and a "voltage of the generator motor".

Thereafter, in step S85, a determination may be made as to whether or not the discharge current iLi_d of the lithium ion battery 52 is smaller than the predetermined threshold id4. In step S85, in a case where a determination is made that the discharge current iLi_d is smaller than the threshold id4 (Y in step S85), the flow may proceed to step S86. In step S86, a determination may be made as to whether or not the applied voltage Visg to the starter generator 16 is smaller than the predetermined threshold V2. In step S86, in a case where a determination is made that the applied voltage Visg is smaller than the threshold V2 (Y in step S86), the flow may proceed to step S87. In step S87, a determination may be made that the switch SW2 is stuck OFF.

In this way, in the case where in step S85, the determination is made that the discharge current iLi_d is smaller than the threshold id4, and in step S86, the determination is made that the applied voltage Visg is smaller than the threshold V2 (Y in step S85 and Y in step S86), the flow may proceed to step S87. In step S87, a determination may be made that the switch SW2 is stuck OFF. Meanwhile, in step S85, in a case where a determination is made that the discharge current iLi_d is equal to or greater than the threshold id4 (N in step S85), or in step S86, in a case where a determination is made that the applied voltage Visg is equal to or greater than the threshold V2 (N in step S86), the flow may proceed to step S88. In step S88, a determination may be made that the switch SW2 is in the normal state.

As illustrated in FIG. 22A mentioned above, in the case where the switch SW2 is normal, the switch SW1 is controlled to the OFF state. The switch SW2 is controlled to the ON state. The starter generator 16 is controlled to the powering state. In this case, the lithium ion battery 52 is coupled to the starter generator 16. Accordingly, the discharge current iLi_d of the lithium ion battery 52 has a current value that corresponds to current consumption of the starter generator 16. Moreover, because the lithium ion battery 52 is coupled to the starter generator 16, the applied voltage Visg to the starter generator 16 is the voltage value that corresponds to the terminal voltage of the lithium ion battery 52.

In contrast, as illustrated in FIG. 22B, in the case where the switch SW2 is stuck OFF, the switch SW1 is controlled to the OFF state. The switch SW2 is kept at the OFF state. The starter generator 16 is controlled to the powering state. In this case, both the lead battery 51 and the lithium ion battery 52 are isolated from the starter generator 16. Accordingly, the discharge current iLi_d of the lithium ion battery 52 is 0 (zero) A, and the applied voltage Visg to the starter generator 16 is 0 (zero) V.

In other words, in the case where the switch SW2 is stuck OFF, the discharge current iLi_d of the lithium ion battery 52 becomes smaller than in the case where the switch SW2 is normal, and the applied voltage Visg to the starter generator 16 becomes smaller than in the case where the switch SW2 is normal. Accordingly, comparing the discharge current iLi_d with the threshold id4 to determine their magnitude relation and grasping how the discharge current iLi_d is decreasing, and comparing the applied voltage Visg with the threshold V2 to determine their magnitude relation and grasping how the applied voltage Visg is decreasing make it possible to detect that the switch SW2 is stuck OFF. It is to be noted that the threshold id4 may be set on the basis of, for example but not limited to, experiments and simulation so as to grasp how the discharge current iLi_d is decreasing. The threshold V2 may be set on the basis of, for example but not limited to, experiments and simulation so as to grasp how the applied voltage Visg is decreasing.

The situation that the switch SW1 is controlled to the OFF state, the switch SW2 is controlled to the ON state, and the starter generator 16 is controlled to the powering state may be exemplified by the situation that the engine 12 is restarted in the idling stop control, as illustrated in FIG. 6. In other words, executing the malfunctioning determination control, part 8, in restarting the engine 12 in the idling stop control, makes it possible to detect easily that the switch SW2 is stuck OFF.

[Fail-Safe Control]
(Inhibition of Idling Stop Control)
(Inhibition of Motor Assistance Control)

In the followings, description is given of a fail-safe control to be executed by the vehicle power supply apparatus 10. The fail-safe control may be executed by the fail-safe control unit 91 of the main controller 80 in a case where, for example, any one of parts 1 to 8 of the malfunctioning determination control as described above is executed, and thereby the determination is made that the switch SW2 is stuck OFF. It is to be noted that a method of determining whether the switch SW2 is stuck OFF is not limited to the malfunctioning determination control, parts 1 to 8 as described above. Instead, the determination as to whether the switch SW2 is stuck OFF may be made by other methods.

Figure 24:
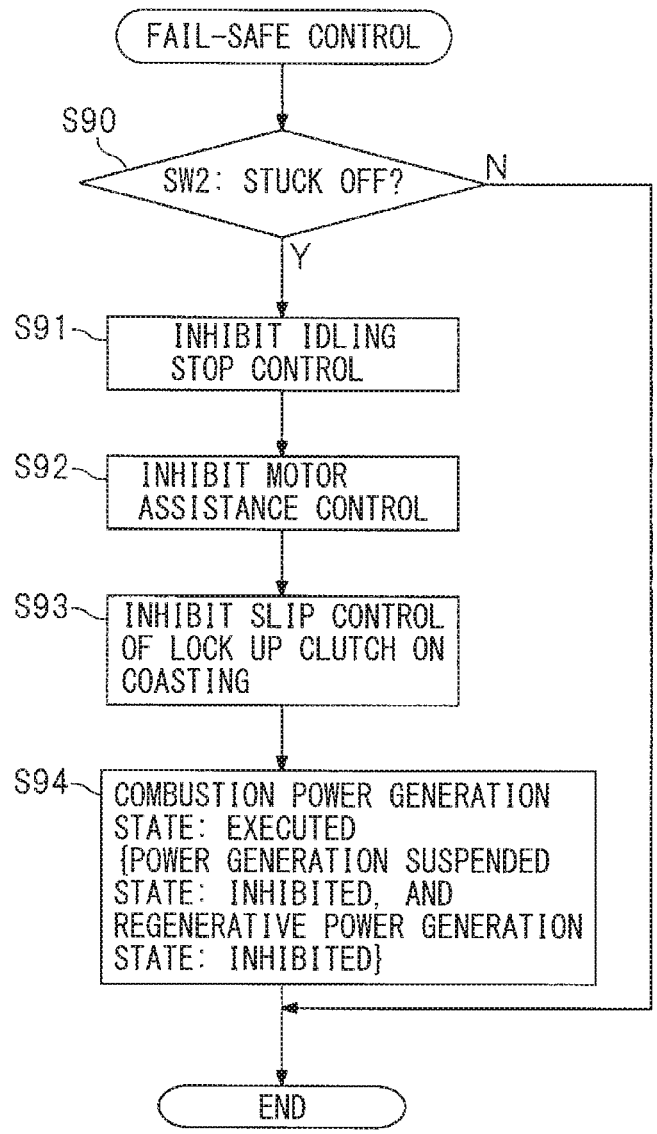
FIG. 24 is a flowchart of an example of an execution procedure in a fail-safe control.

FIG. 24 is a flowchart of an example of an execution procedure of the fail-safe control. Referring to FIG. 24, in step S90, a determination may be made as to whether or not the switch SW2 is stuck OFF. In step S90, in a case where a determination is made that the switch SW2 is stuck OFF (Y in step S90), the flow may proceed to step S91. In step S91, the idling stop control may be inhibited, and the flow may proceed to step S92. In step S92, the motor assistance control may be prohibited.

The situation that the switch SW2 is stuck OFF is equivalent to a situation that it is impracticable to couple the lithium ion battery 52 to the power circuit 50. In this situation, it is impracticable to allow the lithium ion battery 52 to discharge, causing difficulties in controlling the starter generator 16 to the powering state. Accordingly, in the case where the switch SW2 is stuck OFF, the idling stop control and the motor assistance control may be inhibited as fail-safe operation, to inhibit the powering state of the starter generator 16.

In other words, in the idling stop control, the starter generator 16 is controlled to the powering state at the restart of the engine 12. At this occasion, the isolation of the lithium ion battery 52 from the power circuit 50 causes large electric power supply from the lead battery 51 to the starter generator 16. This makes it difficult to maintain the power supply voltage of the group of the electric devices 64. Accordingly, in the case where the switch SW2 is stuck OFF, the idling stop control may be inhibited, to inhibit the powering state of the starter generator 16. This makes it possible to suppress the state of charge SOC of the lead battery 51 from lowering. Hence, it is possible to stabilize the power supply voltage, and allow the group of the electric devices 64 to function appropriately.

Likewise, in the motor assistance control, the starter generator 16 is controlled to the powering state at the time of, for example, the start and the acceleration. At this occasion, the isolation of the lithium ion battery 52 from the power circuit 50 causes the large electric power supply from the lead battery 51 to the starter generator 16. This makes it difficult to maintain the power supply voltage of the group of the electric devices 64. Accordingly, in the case where the switch SW2 is stuck OFF, the motor assistance control may be inhibited, to inhibit the powering state of the starter generator 16. This makes it possible to suppress the state of charge SOC of the lead battery 51 from lowering. Hence, it is possible to stabilize the power supply voltage, and allow the group of the electric devices 64 to function appropriately.

(Inhibition of Slip Control of Lock Up Clutch on Coasting)

As illustrated in FIG. 24, in step S90, in the case where the determination is made that the switch SW2 is stuck OFF (Y in step S90), the flow may proceed, through steps S91 and S92, to step S93. In step S93, the slip control of the lock up clutch on the coasting may be inhibited. It is to be noted that the slip control of the lock up clutch on the coasting is a control to be executed on decelerated travel in a low vehicle speed region from viewpoint of reduction in an amount of fuel consumption.

In one embodiment of the technology, the slip control of the lock up clutch on the coasting may serve as a "slip control of the lock up clutch".

Figure 25:
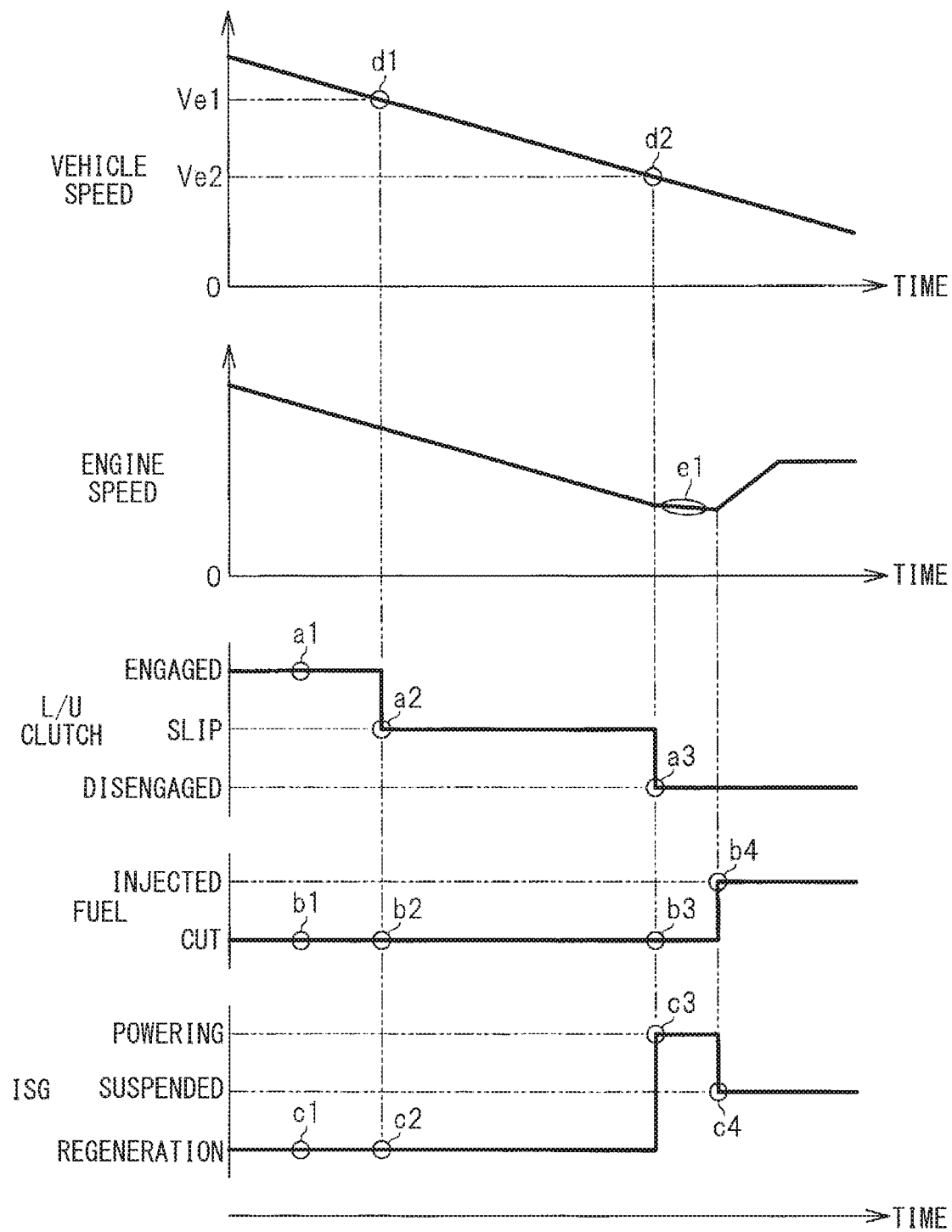
FIG. 25 is a timing chart of an example of an operation state of a power unit in a slip control of a lock up clutch on coasting.

Described below is the slip control of the lock up clutch on the coasting, following which described is a reason for inhibition of the slip control of the lock up clutch on the coasting. FIG. 25 is a timing chart of an example of an operation state of the power unit 13 in the slip control of the lock up clutch on the coasting. In FIG. 25, the lock up clutch 40 is abbreviated to "L/U" and the starter generator 16 is abbreviated to "ISG".

Referring to FIG. 25, on the coasting, i.e., gradual deceleration with the release of the stepping down of the accelerator pedal, the lock up clutch 40 is controlled to the engaged state (reference characters a1). The injector of the engine auxiliaries 39 is controlled to the fuel cut state (reference characters b1). The starter generator 16 is controlled to the regenerative power generation state (reference characters c1). Thus, on the coasting, the injector is controlled to the fuel cut state, to stop the fuel injection and to reduce the amount of the fuel consumption.

The coasting causes the vehicle speed to lower and to become smaller than a predetermined first vehicle speed Ve1 (reference characters d1). Thereupon, the lock up clutch 40 may be controlled from the engaged state to the slip state (reference characters a2), with the fuel cut state of the injector continued (reference characters b2), and with the regenerative power generation state of the starter generator continued (reference characters c2). Furthermore, the coasting causes the vehicle speed to lower and to become smaller than a second vehicle speed Ve2 lower than the first vehicle speed Ve1 (reference characters d2). Thereupon, the lock up clutch 40 may be controlled from the slip state to the disengaged state (reference characters a3), and the starter generator 16 may be controlled from the regenerative power generation state to the powering state (reference characters c3), with the fuel cut state of the injector continued (reference characters b3). Thereafter, the starter generator 16 may be controlled in the powering state for predetermined time. Thereupon, the starter generator 16 may be controlled from the powering state to the power generation suspended state (reference characters c4), and the injector may be controlled from the fuel cut state to the fuel injection state (reference characters b4).

As described, in the slip control of the lock up clutch on the coasting, the starter generator 16 may be controlled to the powering state. This makes it possible to suppress the engine speed from lowering, as denoted by reference characters e1. Hence, it is possible to avoid engine stall even in a case where the restart of the fuel injection is retarded. In other words, allowing the starter generator 16 to suppress the engine speed from lowering makes it possible to continue the fuel cut state and to reduce the amount of the fuel consumption, even in a vehicle speed region in which simply restarting the fuel injection may possibly cause the engine stall.

As mentioned above, in the slip control of the lock up clutch on the coasting, the starter generator 16 may be controlled to the powering state. At this occasion, the isolation of the lithium ion battery 52 from the power circuit 50 causes the large electric power supply from the lead battery 51 to the starter generator 16. This may contribute to difficulties in maintaining the power supply voltage of the group of the electric devices 64. Accordingly, as illustrated in FIG. 24, in the case where the switch SW2 is stuck OFF, the slip control of the lock up clutch on the coasting may be inhibited, to inhibit the powering state of the starter generator 16. This makes it possible to suppress the state of charge SOC of the lead battery 51 from lowering. Hence, it is possible to stabilize the power supply voltage and to allow the group of the electric devices 64 to function appropriately.

It is to be noted that in disengaging the lock up clutch 40 in the slip control of the lock up clutch on the coasting, the lock up clutch 40 may be switched from the slip state to the disengaged state, instead of being switched from the engaged state to the disengaged state. This makes it possible to disengage the lock up clutch 40 quickly. Hence, it is possible to retard restart timing of the fuel injection while preventing the engine stall. Moreover, in the example illustrated in the figures, in the slip control of the lock up clutch on the coasting, the starter generator 16 is switched from the power generation state to the powering state (reference characters c3), and the starter generator 16 is switched from the powering state to the power generation suspended state (reference characters c4). However, this is non-limiting. For example, the starter generator 16 may be switched from the power generation suspended state to the powering state, or alternatively, the starter generator 16 may be switched from the powering state to the power generation state.

(Execution of Combustion Power Generation State)

As illustrated in FIG. 24, in step S90, in the case where the determination is made that the switch SW2 is stuck OFF (Y in step S90), the flow may proceed, through steps S91 to S93, to step S94. In step S94, the combustion power generation state of the starter generator 16 may be executed. In other words, in the case where the determination is made that the switch SW2 is stuck OFF (Y in step S90), the starter generator 16 may be controlled to the combustion power generation state because the powering state of the starter generator 16 is inhibited. As mentioned above, in the case where the switch SW2 is stuck OFF, it is impracticable to couple the lithium ion battery 52 to the power circuit 50. In other words, the situation is that solely the lead battery 51 as the accumulator is coupled to the power circuit 50. It is, therefore, desirable to keep high the state of charge SOC of the lead battery 51, in order to maintain the power supply voltage of the group of the electric devices 64. Thus, in the case where the switch SW2 is stuck OFF, the starter generator 16 is kept controlled in the combustion power generation state. This makes it possible to keep the lead battery 51 charged slowly. Hence, it is possible to stabilize the power supply voltage and to allow the group of the electric devices 64 to function appropriately.

As mentioned above, in step S94, the starter generator 16 may be controlled to the combustion power generation state. In the starter generator 16 as illustrated in the figures may be controlled to the combustion power generation state, the regenerative power generation state, and the power generation suspended state, by controlling the power generation voltage of the starter generator 16. In other words, in step S94, controlling the starter generator 16 to the combustion power generation state means inhibition of the power generation suspended state of the starter generator 16. Moreover, in step S94, controlling the starter generator 16 to the combustion power generation state means inhibition of the regenerative power generation state of the starter generator 16.

As described, in step S94, the power generation suspended state of the starter generator 16 may be inhibited. This makes it possible to suppress the state of charge SOC of the lead battery 51 from lowering, even in the case where the switch SW2 is stuck OFF. Hence, it is possible to stabilize the power supply voltage and to allow the group of the electric devices 64 to function appropriately. Moreover, in step S94, the regenerative power generation state of the starter generator 16 may be inhibited. This makes it possible to avoid excessive charge of the lead battery 51, even in the case where the switch SW2 is stuck OFF. Hence, it is possible to suppress degradation of the lead battery 51.

Although some preferred embodiments of the technology are described above by way of example with reference to the accompanying drawings, the technology is by no means limited to the embodiments described above. It should be appreciated that modifications and alterations may be made by persons skilled in the art without departing from the scope as defined by the appended claims. In the forgoing example embodiments, the lead battery 51 may serve as the "first electrical energy accumulator", but this is non-limiting. Other kinds of batteries or capacitors may be adopted as the "first electrical energy accumulator". Moreover, in the forgoing example embodiments, the lithium ion battery 52 may serve as the "second electrical energy accumulator", but this is non-limiting. Other kinds of batteries or capacitors may be adopted as the "second electrical energy accumulator". Furthermore, in the forgoing example embodiments illustrated in FIGS. 1 and 2, the switch SW2 is provided on the positive electrode line 54 of the lithium ion battery 52, but this is non-limiting. For example, as denoted by an alternate long and short dashed line in FIG. 2, the switch SW2 may be provided on the negative electrode line 59 of the lithium ion battery 52. In addition, in the forgoing example embodiments, the main controller 80 includes the engine control unit 81, the ISG control unit 82, the first switch control unit 83, the second switch control unit 84, the starter control unit 86, the clutch control unit 87, the idling control unit 88, the assistance control unit 89, the slip control unit 90, the fail-safe control unit 91, and the malfunctioning determination unit 85, but this is non-limiting. The engine control unit 81, the ISG control unit 82, the first switch control unit 83, the second switch control unit 84, the starter control unit 86, the clutch control unit 87, the idling control unit 88, the assistance control unit 89, the slip control unit 90, the fail-safe control unit 91, or the malfunctioning determination unit 85, or any combination thereof may be provided in other controllers, or alternatively, the engine control unit 81, the ISG control unit 82, the first switch control unit 83, the second switch control unit 84, the starter control unit 86, the clutch control unit 87, the idling control unit 88, the assistance control unit 89, the slip control unit 90, the fail-safe control unit 91, and the malfunctioning determination unit 85 may be distributed over a plurality of controllers.

As to the malfunctioning determination control, parts 1 to 8 illustrated in FIGS. 10 to 23, any one of parts 1 to 8 of the malfunctioning determination control may be executed alone. Alternatively, two or more of parts 1 to 8 of the malfunctioning determination control may be executed in combination. For example, parts 1 and 2 of the malfunctioning determination control may be executed in combination. In this case, the determination may be made that the switch SW2 is stuck OFF in a case where a determination is made, on the basis of the malfunctioning determination control, part 1, that the discharge current iLi_d of the lithium ion battery 52 is smaller than the threshold id1, and a determination is made, on the basis of the malfunctioning determination control, part 2, that the applied voltage Visg to the starter generator 16 is smaller than the threshold V1 (Y in step S14 and Yin step S24).

In the fail-safe control illustrated in FIG. 24, in the case where the determination is made that the switch SW2 is stuck OFF, the idling stop control is inhibited; the motor assistance control is inhibited; the slip control of the lock up clutch on the coasting is inhibited; and the combustion power generation state of the starter generator 16 is executed. However, this is non-limiting. For example, in the case where the determination is made that the switch SW2 is stuck OFF, the idling stop control, the motor assistance control, or the slip control of the lock up clutch on the coasting, or any combination thereof may be inhibited. Moreover, in the case where the determination is made that the switch SW2 is stuck OFF, the powering state of the starter generator 16 may be inhibited by executing the combustion power generation state of the starter generator 16, without inhibiting the idling stop control and the motor assistance control, without limitation.

As described, the fail-safe control unit 91 inhibits the powering state of the starter generator 16 in the case where the switch SW2 is in the malfunctioning state in which the switch SW2 is rendered inoperative in the OFF state. Hence, it is possible to control the starter generator 16 appropriately in the case where the switch SW2 is in the malfunctioning state in which the switch SW2 is rendered inoperative in the OFF state.

The main controller 80, the engine control unit 81, the ISG control unit 82, the first switch control unit 83, the second switch control unit 84, the malfunctioning determination unit 85, the starter control unit 86, the clutch control unit 87, the idling control unit 88, the assistance control unit 89, the slip control unit 90, and the fail-safe control unit 91 illustrated in FIG. 1 are implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the main controller 80, the engine control unit 81, the ISG control unit 82, the first switch control unit 83, the second switch control unit 84, the malfunctioning determination unit 85, the starter control unit 86, the clutch control unit 87, the idling control unit 88, the assistance control unit 89, the slip control unit 90, and the fail-safe control unit 91. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the main controller 80, the engine control unit 81, the ISG control unit 82, the first switch control unit 83, the second switch control unit 84, the malfunctioning determination unit 85, the starter control unit 86, the clutch control unit 87, the idling control unit 88, the assistance control unit 89, the slip control unit 90, and the fail-safe control unit 91 illustrated in FIG. 1.

It should be appreciated that modifications and alterations may be made by persons skilled in the art without departing from the scope as defined by the appended claims. The use of the terms first, second, etc. does not denote any order or importance, but rather the terms first, second, etc. are used to distinguish one element from another. The technology is intended to include such modifications and alterations in so far as they fall within the scope of the appended claims or the equivalents thereof.

The invention claimed is:

1. A vehicle power supply apparatus to be mounted on a vehicle that includes an engine, the vehicle power supply apparatus comprising:
   a first power supply system including a first electrical energy accumulator and an electric load coupled to the first electrical energy accumulator;
   a second power supply system including a generator motor and a second electrical energy accumulator, the generator motor being coupled to the engine and being configured to be controlled to at least a powering state, and the second electrical energy accumulator being able to be coupled to the generator motor;
   a first switch configured to be controlled to a first turn-on state and a first turn-off state, the first turn-on state including coupling the first power supply system and the second power supply system to each other, and the first turn-off state including isolating the first power supply system and the second power supply system from each other;
   a second switch configured to be controlled to a second turn-on state and a second turn-off state, the second turn-on state including coupling the generator motor and the second electrical energy accumulator to each other, and the second turn-off state including isolating the generator motor and the second electrical energy accumulator from each other; and
   a fail-safe controller configured to inhibit the powering state of the generator motor on a condition that the second switch is in a malfunctioning state in which the second switch is rendered inoperative in the second turn-off state.

2. The vehicle power supply apparatus according to claim 1, further comprising:
   a lock up clutch provided in a torque converter of the vehicle and configured to be controlled to an engaged state, a disengaged state, and a slip state, the torque converter being coupled to the engine; and
   a slip controller configured to perform a slip control of the lock up clutch, the slip control including switching the lock up clutch from the engaged state to the slip state on a condition that a vehicle speed is lower than a first vehicle speed, and switching the lock up clutch from the slip state to the disengaged state while controlling the generator motor to the powering state on a condition that the vehicle speed is lower than a second vehicle speed lower than the first vehicle speed, wherein
   the fail-safe controller inhibits the slip control on the condition that the second switch is in the malfunctioning state in which the second switch is rendered inoperative in the second turn-off state.

3. The vehicle power supply apparatus according to claim 1, further comprising an assistance controller that performs a motor assistance control, the motor assistance control including controlling the generator motor to the powering state to provide assistance with the engine, wherein
   the fail-safe controller inhibits the motor assistance control on the condition that the second switch is in the malfunctioning state in which the second switch is rendered inoperative in the second turn-off state.

4. The vehicle power supply apparatus according to claim 2, further comprising an assistance controller that performs a motor assistance control, the motor assistance control including controlling the generator motor to the powering state to provide assistance with the engine, wherein
   the fail-safe controller inhibits the motor assistance control on the condition that the second switch is in the malfunctioning state in which the second switch is rendered inoperative in the second turn-off state.

5. The vehicle power supply apparatus according to claim 1, further comprising a generator motor controller that lowers a power generation voltage of the generator motor to a first value lower than a terminal voltage of the first electrical energy accumulator and a terminal voltage of the second electrical energy accumulator to control the generator motor to a power generation suspended state, wherein
   the fail-safe controller inhibits the power generation suspended state of the generator motor on the condition that the second switch is in the malfunctioning state in which the second switch is rendered inoperative in the second turn-off state.

6. The vehicle power supply apparatus according to claim 2, further comprising a generator motor controller that lowers a power generation voltage of the generator motor to a first value lower than a terminal voltage of the first electrical energy accumulator and a terminal voltage of the second electrical energy accumulator to control the generator motor to a power generation suspended state, wherein
   the fail-safe controller inhibits the power generation suspended state of the generator motor on the condition that the second switch is in the malfunctioning state in which the second switch is rendered inoperative in the second turn-off state.

7. The vehicle power supply apparatus according to claim 5, wherein
   the generator motor controller controls the generator motor to a normal power generation state and a regenerative power generation state, the normal power generation state including raising the power generation voltage of the generator motor to a second value higher than the terminal voltage of the first electrical energy accumulator and the terminal voltage of the second electrical energy accumulator, and the regenerative power generation state including raising the power generation voltage of the generator motor to a third value higher than the second value of the normal power generation state, and
   the fail-safe controller inhibits the regenerative power generation state of the generator motor on the condition that the second switch is in the malfunctioning state in which the second switch is rendered inoperative in the second turn-off state.

8. The vehicle power supply apparatus according to claim 6, wherein
   the generator motor controller controls the generator motor to a normal power generation state and a regenerative power generation state, the normal power generation state including raising the power generation voltage of the generator motor to a second value higher than the terminal voltage of the first electrical energy accumulator and the terminal voltage of the second electrical energy accumulator, and the regenerative power generation state including raising the power generation voltage of the generator motor to a third value higher than the second value of the normal power generation state, and the fail-safe controller inhibits the regenerative power generation state of the generator motor on the condition that the second switch is in the malfunctioning state in which the second switch is rendered inoperative in the second turn-off state.

9. The vehicle power supply apparatus according to claim 7, wherein the fail-safe controller causes execution of the normal power generation state of the generator motor on the condition that the second switch is in the malfunctioning state in which the second switch is rendered inoperative in the second turn-off state.

10. The vehicle power supply apparatus according to claim 8, wherein the fail-safe controller causes execution of the normal power generation state of the generator motor on the condition that the second switch is in the malfunctioning state in which the second switch is rendered inoperative in the second turn-off state.

11. The vehicle power supply apparatus according to claim 2, further comprising an idling controller that performs an idling stop control, the idling stop control including stopping the engine on a basis of a stop condition and afterwards controlling, on a basis of a start condition, the generator motor to the powering state to restart the engine, wherein the fail-safe controller inhibits the idling stop control on the condition that the second switch is in the malfunctioning state in which the second switch is rendered inoperative in the second turn-off state.

12. The vehicle power supply apparatus according to claim 3, further comprising an idling controller that performs an idling stop control, the idling stop control including stopping the engine on a basis of a stop condition and afterwards controlling, on a basis of a start condition, the generator motor to the powering state to restart the engine, wherein the fail-safe controller inhibits the idling stop control on the condition that the second switch is in the malfunctioning state in which the second switch is rendered inoperative in the second turn-off state.

13. The vehicle power supply apparatus according to claim 4, further comprising an idling controller that performs an idling stop control, the idling stop control including stopping the engine on a basis of a stop condition and afterwards controlling, on a basis of a start condition, the generator motor to the powering state to restart the engine, wherein the fail-safe controller inhibits the idling stop control on the condition that the second switch is in the malfunctioning state in which the second switch is rendered inoperative in the second turn-off state.

14. The vehicle power supply apparatus according to claim 1, further comprising a malfunctioning determination unit that determines whether or not the second switch is in the malfunctioning state in which the second switch is rendered inoperative in the second turn-off state, on a basis of a current of the first electrical energy accumulator, a current of the second electrical energy accumulator, or a voltage of the generator motor, or any combination thereof, while recognizing a first control signal to be transmitted to the generator motor, a second control signal to be transmitted to the first switch, and a third control signal to be transmitted to the second switch.

15. The vehicle power supply apparatus according to claim 2, further comprising a malfunctioning determination unit that determines whether or not the second switch is in the malfunctioning state in which the second switch is rendered inoperative in the second turn-off state, on a basis of a current of the first electrical energy accumulator, a current of the second electrical energy accumulator, or a voltage of the generator motor, or any combination thereof, while recognizing a first control signal to be transmitted to the generator motor, a second control signal to be transmitted to the first switch, and a third control signal to be transmitted to the second switch.

16. The vehicle power supply apparatus according to claim 3, further comprising a malfunctioning determination unit that determines whether or not the second switch is in the malfunctioning state in which the second switch is rendered inoperative in the second turn-off state, on a basis of a current of the first electrical energy accumulator, a current of the second electrical energy accumulator, or a voltage of the generator motor, or any combination thereof, while recognizing a first control signal to be transmitted to the generator motor, a second control signal to be transmitted to the first switch, and a third control signal to be transmitted to the second switch.

17. The vehicle power supply apparatus according to claim 4, further comprising a malfunctioning determination unit that determines whether or not the second switch is in the malfunctioning state in which the second switch is rendered inoperative in the second turn-off state, on a basis of a current of the first electrical energy accumulator, a current of the second electrical energy accumulator, or a voltage of the generator motor, or any combination thereof, while recognizing a first control signal to be transmitted to the generator motor, a second control signal to be transmitted to the first switch, and a third control signal to be transmitted to the second switch.

18. A vehicle power supply apparatus to be mounted on a vehicle that includes an engine, the vehicle power supply apparatus comprising:

a first power supply system including a first electrical energy accumulator and an electric load coupled to the first electrical energy accumulator;

a second power supply system including a generator motor and a second electrical energy accumulator, the generator motor being coupled to the engine and being configured to be controlled to at least a powering state, and the second electrical energy accumulator being able to be coupled to the generator motor;

a first switch configured to be controlled to a first turn-on state and a first turn-off state, the first turn-on state including coupling the first power supply system and the second power supply system to each other, and the first turn-off state including isolating the first power supply system and the second power supply system from each other;

a second switch configured to be controlled to a second turn-on state and a second turn-off state, the second turn-on state including coupling the generator motor and the second electrical energy accumulator to each other, and the second turn-off state including isolating the generator motor and the second electrical energy accumulator from each other; and circuitry configured to inhibit the powering state of the generator motor on a condition that the second switch is in a malfunctioning state in which the second switch is rendered inoperative in the second turn-off state.

* * * * *